(12) United States Patent
Wyler

(10) Patent No.: US 12,679,079 B2
(45) Date of Patent: Jul. 14, 2026

(54) SPACE DEBRIS CAPTURE APPARATUS AND METHODS FOR IMPLENTING THE SAME

(71) Applicant: WILDSTAR, LLC, Saratoga, CA (US)

(72) Inventor: Gregory Thane Wyler, Stuart, FL (US)

(73) Assignee: WildStar LLC, Arlington, TX (US)

( * ) Notice: Subject to any disclaimer, the term of this patent is extended or adjusted under 35 U.S.C. 154(b) by 98 days.

(21) Appl. No.: 18/715,036

(22) PCT Filed: Jan. 11, 2023

(86) PCT No.: PCT/US2023/010633
§ 371 (c)(1),
(2) Date: May 30, 2024

(87) PCT Pub. No.: WO2023/137082
PCT Pub. Date: Jul. 20, 2023

(65) Prior Publication Data
US 2025/0033802 A1      Jan. 30, 2025

Related U.S. Application Data

(60) Provisional application No. 63/400,328, filed on Aug. 23, 2022, provisional application No. 63/298,403, filed on Jan. 11, 2022.

(51) Int. Cl.
B32B 27/32          (2006.01)
B32B 5/02          (2006.01)
(Continued)

(52) U.S. Cl.
CPC ................ B32B 27/32 (2013.01); B32B 5/02 (2013.01); B32B 27/12 (2013.01); B32B 27/34 (2013.01);
(Continued)

(58) Field of Classification Search
CPC ........... B32B 5/02; B32B 27/12; B32B 27/32; B32B 27/34; B32B 2307/56;
(Continued)

(56) References Cited

U.S. PATENT DOCUMENTS 3,004,735 A * 10/1961 Kinard ..................... B64G 1/52
                                                         250/389
3,896,758 A *  7/1975 Di Battista ............. G01W 1/00
                                                         73/12.05

(Continued)

FOREIGN PATENT DOCUMENTS

CN          107697319 B      10/2019
CN          113682495 A      11/2021
(Continued)

OTHER PUBLICATIONS

International Application No. PCT/US2023/010633, International Search Report and Written Opinion mailed Apr. 19, 2023, 10 pages.

*Primary Examiner* — Joshua E Rodden

(57) ABSTRACT

A satellite includes a structural element that is deformable during a collision with space object(s). The structural element includes a first side, a second side spaced apart from the first side to define an interior portion between the first side and the second side, and at least one material disposed within the interior portion. The first side includes a first layer of material with payload element(s) disposed thereon, and the second side includes a second layer of material. The material disposed within the interior portion is designed to absorb energy over time during a collision process with each space object. The first layer, the second layer and/or the material disposed within the interior portion are configured to capture one or more space objects upon collision with the satellite.

20 Claims, 11 Drawing Sheets

(51) Int. Cl.

| | |
|---|---|
| *B32B 27/12* | (2006.01) |
| *B32B 27/34* | (2006.01) |
| *B64G 1/10* | (2006.01) |
| *B64G 1/24* | (2006.01) |
| *B64G 1/44* | (2006.01) |
| *B64G 1/56* | (2006.01) |
| *B64G 1/64* | (2006.01) |

(52) U.S. Cl.

CPC ............. *B64G 1/10* (2013.01); *B64G 1/1081* (2023.08); *B64G 1/242* (2013.01); *B64G 1/443* (2013.01); *B64G 1/56* (2013.01); *B64G 1/6462* (2023.08); *B32B 2307/56* (2013.01); *B32B 2571/02* (2013.01)

(58) Field of Classification Search

CPC .... B32B 2571/02; B64G 1/10; B64G 1/1078; B64G 1/1081; B64G 1/1085; B64G 1/242; B64G 1/443; B64G 1/56; B64G 1/6462

USPC ...................................................... 244/171.7

See application file for complete search history.

(56) References Cited

U.S. PATENT DOCUMENTS

| | | | | |
|---|---|---|---|---|
| 4,991,799 | A * | 2/1991 | Petro | B64G 1/56 244/172.6 |
| 5,601,258 | A * | 2/1997 | McClymonds | B64G 1/56 428/36.1 |
| 5,610,363 | A * | 3/1997 | Crews | F41H 5/0457 89/36.02 |
| 5,830,548 | A * | 11/1998 | Andersen | C04B 28/04 428/152 |
| 6,298,765 | B1 * | 10/2001 | Dvorak | F41H 5/013 89/36.02 |
| 6,568,640 | B1 * | 5/2003 | Barnett | B64G 1/2227 244/172.6 |
| 6,712,318 | B2 * | 3/2004 | Gubert | B64G 1/56 244/121 |
| 7,204,460 | B2 * | 4/2007 | Bigelow | B64G 1/56 244/171.1 |
| 7,213,497 | B1 * | 5/2007 | Garcia | F42D 5/05 89/36.02 |
| 8,567,725 | B2 * | 10/2013 | Wright | B64G 1/56 244/172.6 |
| 9,038,959 | B2 * | 5/2015 | Andoh | B64G 1/645 244/171.1 |
| 9,617,017 | B1 | 4/2017 | Kaplan | |
| 9,714,101 | B1 * | 7/2017 | Kaplan | B64G 1/26 |
| 10,717,549 | B2 * | 7/2020 | Choi | B64G 1/1081 |
| 11,312,513 | B2 * | 4/2022 | Moody | B32B 1/08 |
| 11,358,375 | B1 * | 6/2022 | Watkins | B32B 15/046 |
| 11,724,833 | B2 * | 8/2023 | de Jong | B64G 1/56 244/171.7 |
| 11,897,638 | B2 * | 2/2024 | Akiyama | B64G 1/54 |
| 2002/0195030 | A1 * | 12/2002 | Christiansen | E06B 9/00 109/49.5 |
| 2005/0284986 | A1 | 12/2005 | Bigelow | |
| 2011/0309200 | A1 * | 12/2011 | Knirsch | B64G 1/1081 701/13 |
| 2016/0167811 | A1 * | 6/2016 | Gordon | B32B 27/08 428/521 |
| 2021/0163156 | A1 | 6/2021 | Olafsrud et al. | |
| 2021/0367093 | A1 * | 11/2021 | Van Gaever | H02S 50/10 |
| 2022/0089303 | A1 * | 3/2022 | Pang | B64G 1/506 |
| 2023/0011302 | A1 * | 1/2023 | Wang | B32B 27/32 |
| 2023/0011943 | A1 * | 1/2023 | Wang | B32B 15/046 |
| 2023/0093716 | A1 * | 3/2023 | Wyler | H01Q 1/08 244/166 |

FOREIGN PATENT DOCUMENTS

| | | | |
|---|---|---|---|
| EP | 2399830 | A2 | 12/2011 |
| JP | H0840400 | A | 2/1996 |
| JP | 2004098959 | A | 4/2004 |

\* cited by examiner

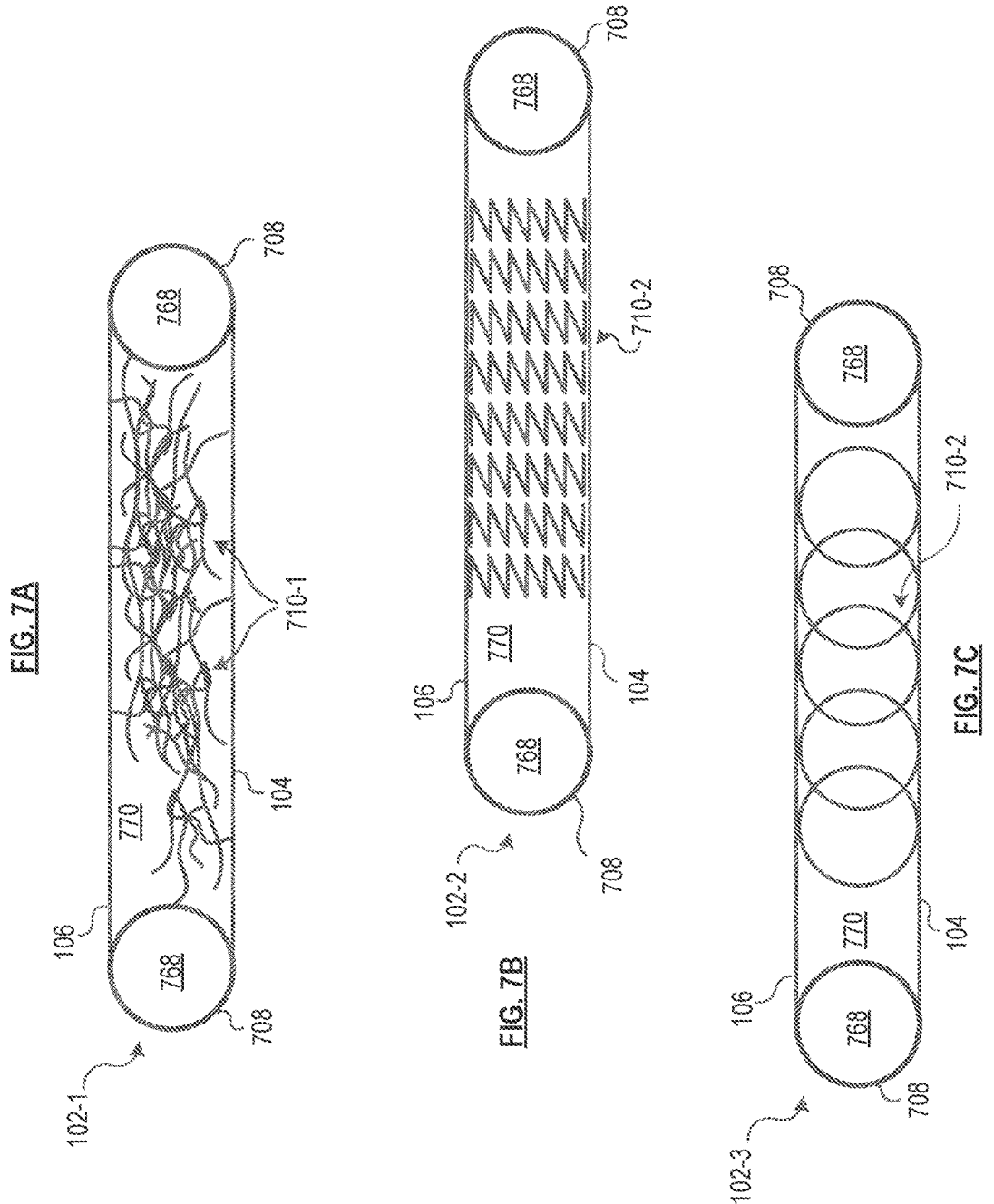

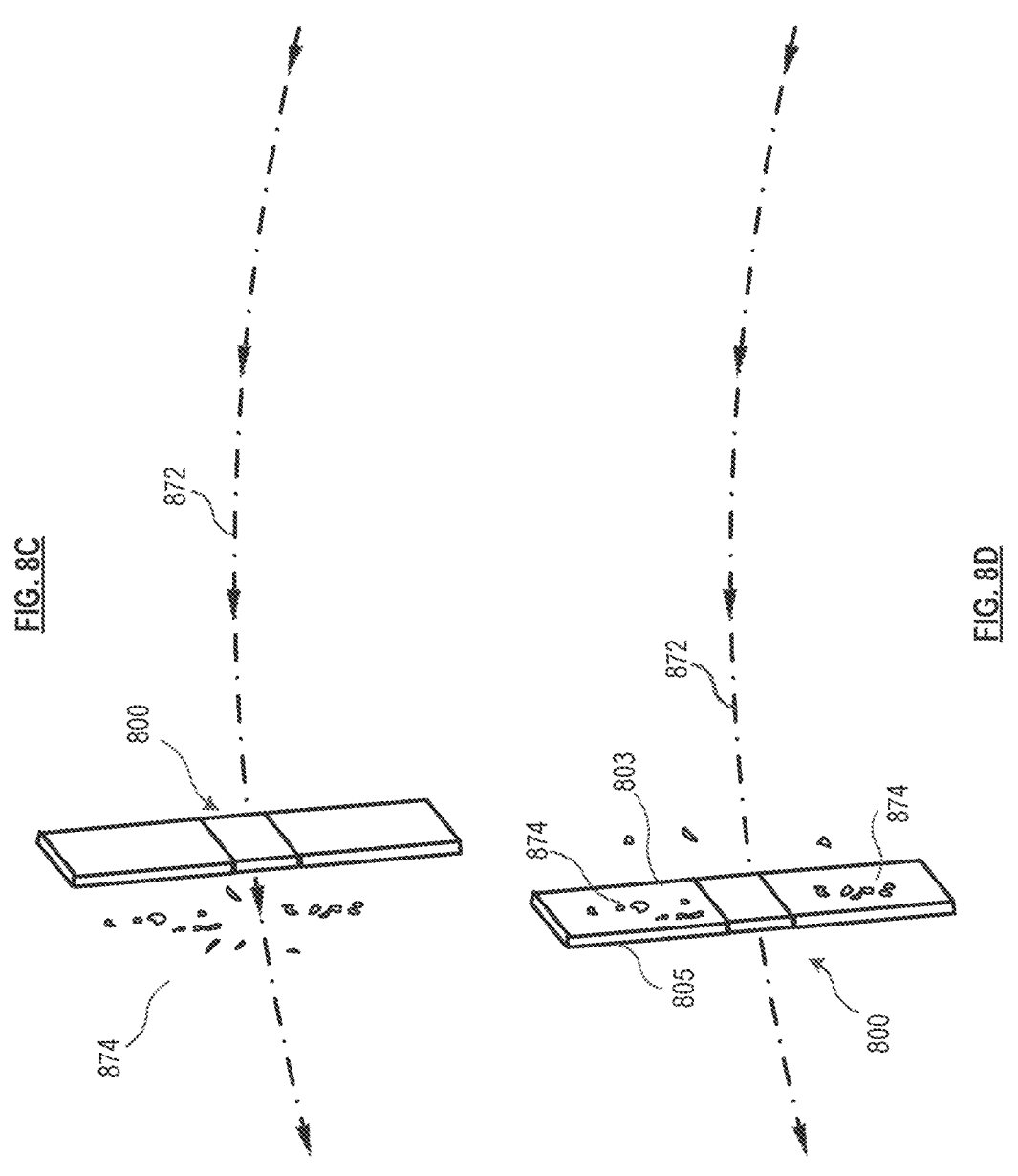

SPACE DEBRIS CAPTURE APPARATUS AND METHODS FOR IMPLENTING THE SAME

STATEMENT OF RELATED CASES

This application is a national stage application, filed under 35 U.S.C. § 371, of International Patent Application No. PCT/US2023/010633, filed on Jan. 11, 2023, which is incorporated by reference herein in its entirety. International Patent Application No. PCT/US2023/010633 claims priority from U.S. provisional patent application Ser. No. 63/298,403, filed Jan. 11, 2022, and U.S. provisional patent application Ser. No. 63/400,328, filed Aug. 23, 2022, both of which are incorporated by reference herein in their entirety.

TECHNICAL FIELD

The disclosed embodiments relate to a satellite that can remove space object(s) from orbit.

BACKGROUND

Statistical models estimate that 36,500 objects larger than 10 centimeters, one million objects between 1 to 10 centimeters, and 130 million objects between 0.1 to 1 centimeter are currently in Low Earth Orbit (LEO). Such objects include tiny flecks of paint, remnants from in-orbit collisions, and the like. Orbiting at an average velocity of 7 to 8 kilometers per second, these objects can cause catastrophic damage on impact with a spacecraft.

Of late there has been a renewed interest in space travel, as well as a number of proposals to launch large ("mega") constellations of communications satellites. This increase in orbital traffic significantly increases the likelihood of collisions between debris and satellites. Moreover, the total cross-section of satellites in the orbital shells of the proposed mega constellations increases another risk; impacts with meteoroids. And with this ever-increasing risk of collisions, comes a concomitant increase in orbital debris.

In recognition of this looming problem, scientists and space entrepreneurs have submitted proposals for clearing the orbital space (LEO) of debris. One such proposal involves equipping a small satellite with a "claw" system that mechanically captures (e.g., grabs) orbital debris. Such a system is limited to recovering relatively small debris. The capture operation is relatively complex, since the satellite/capture mechanism must address momentum transfer from the object to the claw, and the fact that the debris is tumbling.

Another proposal employs a satellite with a magnetic capture system. An arm having a magnetic end effector is extended from the satellite to capture orbital debris. Like the claw system, the magnetic capture operation must address momentum transfer as well as the fact that the debris is tumbling. A third proposal involves firing a harpoon or a net at orbital debris from a chaser satellite. The harpoon or net remains connected to the chaser spacecraft via a tether. This system relies on LIDAR or radar to track the orbital debris. After capture, the chaser spacecraft drags the orbital debris into Earth' atmosphere where it's incinerated. A final proposal uses a laser to ablate orbital debris or deflect/slow it so that it burns up in Earth's atmosphere. This approach is limited to small (1 to 10 centimeter) orbital debris.

SUMMARY

In accordance with some of the embodiments disclosed herein, a satellite is provided that includes at least one structural element that is deformable during a collision with one or more space object(s). In some cases, the structural element deforms (e.g., bends, folds, wraps, etc.) around at least part of the space object(s) that it collides with, thereby capturing the space object(s). The term "space object(s)" may include what is commonly referred to a "space debris" or "orbital debris." As non-limiting examples, space object(s) may refer to any object that is in orbit, such as orbital debris, a satellite (including non-functioning, non-functional, and functional satellites), abandoned launch vehicle states, mission-related debris, and/or fragmentation debris.

Each structural element may include opposing first and second sides, which may be substantially planar in some implementations. The first and second sides may be spaced apart from one another, defining an interior region that includes other additional material(s). In accordance with the disclosed embodiments, materials associated with either side of structural element, and/or the material(s) disposed within the interior region of the structural element may be configured to capture one or more space object(s) upon collision with the structural element(s) of the satellite. In a stowed state (such as before the satellite is placed in orbit), the structural element(s) can be folded or rolled due to a flexible nature of the layers of material that make up the structural element(s). In an operational state (such as when the satellite is in orbit), the first side is spaced apart from the second side.

In some embodiments, the structural element(s) include one or more layers of a ballistic material. The layers of ballistic material can be composed of any ultra-strong, ultra-light material, and may be formed from multiple layers of ballistic fibers that may be intended to capture space objects that impact the structural element(s) of the satellite.

In accordance with the present teachings, the structural element is capable of capturing space objects in at least one of two ways. The structural element may intercept and wrap around space objects that may be relatively larger in size. The relative size of the structural element, which may be arbitrarily large, with respect to certain ones of the space objects being captured can allow the structural element of the satellite to capture these relatively large space object(s) by bending, folding or wrapping around at least a portion of the space object(s). In other cases, the space object(s) can penetrate one of the sides of the structural element such that they may be lodged in and captured by any of the material layers that make up the structural element including the materials that may be disposed within an interior portion between the two sides. For example, smaller space object(s) may partially pierce the structural element and become entangled with the materials that may be disposed within the interior portion between the two sides (i.e., the debris-retaining structure). By contrast, larger space object(s) may strike the structural element and cause portions of the structural element to wrap, bend or fold around at least part of those larger space object(s) to thereby captures those relatively larger space object(s). The nature of the capture may depend on factors such as the speed of interception (e.g., relative speed between the space object(s) and the satellite), the shape of the space object(s), the relative size of the structural element and the space object(s), etc. After capturing the space object(s), in some embodiments, the satellite may de-orbit along with the captured the space object(s). In some cases, the deorbiting satellite and the captured space object(s) may incinerate upon re-entry into Earth's atmosphere.

To maneuver to and intentionally collide with space object(s), embodiments of the satellite include a guidance system and propulsion capability, and associated subsystems. The satellite may be directed to maneuver so that it aligns with the incoming space object(s). Depending on the implementation, maneuvering can be controlled via on-board guidance or remote commands. In some embodiments, the satellite includes a directional and attitude controller for controlling one or more of the attitude, position, and velocity of the satellite in such a manner as to cause at least one of the structural elements of the satellite to collide with the space object(s), capture the space object(s), and modify a time for the satellite to de-orbit.

In some embodiments, the satellite includes a propulsion system, one or more actuators, and one or more controller(s). The controller(s) may be configured to control attitude, position and velocity of the satellite via the propulsion system and/or the one or more actuators to cause at least one of the structural element(s) to collide with incoming space object(s) in a manner such that the surface area of the structural element(s) substantially maximized. After capturing the space object(s), the controller(s) may cause a de-orbit of the satellite and the space object(s) captured thereby. In one non-limiting implementation, the controller(s) may be part of an attitude determination and control system (ADCS) for orienting the satellite via one or more actuator(s). The propulsion system may also include one or more actuator(s) for controlling position and/or attitude of the satellite. The propulsion system can be, for example, a chemical propulsion system (e.g., using monopropellant or bipropellant liquid thrusters), a high energy electrical propulsion system, etc. Regardless of the implementation, the controller may be configured to control the ADCS and/or the propulsion system to cause one or more of the structural elements to collide with the space object(s) and subsequently cause a de-orbit of the satellite after capturing the space object(s).

In some embodiments, the satellite includes an electro-dynamic tether. The electrodynamic tether may be implemented, for example, as a coil of electrically conductive material with a mass on one end thereof, which may be stowed on or in the satellite, and deployable for use after one or more space object(s) have been captured. For instance, the coil may be configured to release from the satellite after a collision with the space object(s) to initiate deorbiting of the satellite. Movement of the coil relative to a magnetic field (in one scenario, the Earth's magnetic field) drives a current through the coil that generates a Lorentz force, thereby producing a drag thrust that causes the satellite to deorbit.

As discussed further below, in some embodiments, one side or both sides of the structural element may support a payload. In such embodiments, the satellite may operate as a communications satellite until in nears end-of-life, at which point it may be re-tasked to capture space object(s). The satellite may be re-tasked at any point during its operational life to capture space object(s). The one or more payload elements may be non-releasable from the satellite when the satellite collides with and captures the space object(s).

With respect to such multi-functional capability, in some embodiments, one side of the structural element supports a plurality of thin film solar cells, which may be used to harvest energy to power the satellite's electrical systems and/or power consumers. One or more of the layers of material associated with that one side may function as a support substrate for the thin film solar cells. The layers of material associated with that one side, and/or the layers of material associated with the other side of the structural element, may also provide capture functionality.

Furthermore, in some embodiments, at least one of the layers of material on the second side of the structural element may function as a carrier layer to support a plurality of thin film antenna elements. The thin film antenna elements may be configured to operate as a phased-array antenna in some embodiment. In such embodiments, both sides of the structural element and their associated layers of material are capable of providing dual functionality (e.g., support of thin film solar cells or thin film antenna elements as well as capture functionality).

The structural elements may be dimensioned so that they are substantially larger than the space object(s) they are to capture. The two sides of the structural element may have any shape including a quadrilateral shape, such as a rectangular shape, and may be arbitrarily large. the structural element(s) may have a high aspect ratio such that they have a dimension that is much longer in comparison to their width (e.g., length is at least five times greater than width), while also having a size that is sufficient to support a specific payload (e.g., as dictated by number of antenna elements), and/or power requirements (e.g., a size sufficient to support a requisite number of solar cells and/or batteries). As such, the structural element(s) may capture space object(s) of any size that the structural element is substantially larger than.

In the operational state, when the structural elements are deployed, the first and second sides of each structural element may be spaced apart from one another by a gap between them that defines one dimension of the interior region. The interior region includes one or more additional material(s) between the first and second sides of the structural element. The gap or separation distance between the first side and the second side may serve several purposes that are described in greater detail herein.

For example, as previously mentioned, in some embodiments, the gap may be used to facilitate the capture of space object(s). To facilitate such capture, the material of the debris-retaining structure that may be disposed between the two sides may comprise a number of different materials. In some embodiments, the material of the debris-retaining structure may comprise a mass of fibrous material, such as carbon fiber, natural fibers, aramid, glass fibers, polymer filaments, etc. The fibers can be in the form of individual strands, or woven material. Space object(s), or a portion thereof, that penetrate either of the two sides of the structural element may be captured via the fibrous mass and remain trapped thereby.

In some other embodiments, the material of the debris-retaining structure may be implemented as a plurality of helical springs or coils, which may be oriented so that the long axis of each of the coils may be perpendicular to sides of the structural element. Space object(s), or portions thereof, that penetrate either side of the structural element can then be captured by the coils and remain trapped therein. Alternatively, or additionally, the coils may be oriented with their long axis parallel to the surface of the layers of material. In this embodiment, the coils may serve the dual purpose of both establishing the requisite separation between the sides of the structural element, as well as functioning as the material of the debris-retaining structure.

In various embodiments, the present teachings provide a satellite as follows.

Clause 1. A satellite, comprising: at least one structural element that is deformable during a collision with one or more space objects, the at least one structural element comprising: a first side comprising a first layer of material having one or more payload elements disposed thereon; a second side spaced apart from the first side to define an interior portion between the first side and the second side, the second side comprising a second layer of material; and at least one material disposed within the interior portion, the at least one material designed to absorb energy over time during a collision process with each of the one or more space objects, wherein one or more of the first layer of material, the second layer of material and the at least one material that is disposed within the interior portion are configured to capture one or more space objects upon collision with the satellite.

Clause 2. The satellite of clause 1, wherein the at least one material is an energy absorbing material, and the first layer of material and the second layer of material are substantially planar materials spaced apart by the energy absorbing material.

Clause 3. The satellite of clause 1 or 2, wherein the at least one material disposed within the interior portion comprises: deformable material disposed in different cross-sectional planes of the interior portion such that different portions of the deformable material come into contact with and absorb energy of the one or more space objects at different time instants during the collision process with each of the one or more space objects as the at least one structural element deforms and wraps around at least part of the one or more space objects.

Clause 4. The satellite of clause 1 or 2 or 3, wherein the at least one material disposed within the interior portion comprises one or more of: fibrous material, fabric material (e.g., a woven or threaded material), filaments of material, material having mesh-like structure comprising a grid having a number of openings; material having a lattice structure, and material having a helical spring-like structure.

Clause 5. The satellite of clause 1 or 2 or 3 or 4, wherein the first layer of material and the second layer of material comprise: one or more layers of ballistic material.

Clause 6. The satellite of clause 5, wherein the one or more layers of ballistic material comprise one or more of: an aramid-based (aromatic polyamide) material, a high density polyethylene (HDPE) material, or an ultra-high molecular weight polyethylene (UHMwPE) material.

Clause 7. The satellite of clause 5, wherein the at least one structural element comprises one or more inflatable regions, and wherein the satellite further comprises: inflation means for causing the one or more inflatable regions to inflate, and wherein the one or more layers of ballistic material are configured to capture one or more space objects that impact the at least one structural element, and wherein deflation of the one or more inflatable regions initiates deorbiting of the satellite.

Clause 8. The satellite of clause 7, wherein the one or more inflatable regions of the at least one structural element are deflatable upon being impacted by the one or more space objects, and wherein deflation of the one or more inflatable regions causes the at least one structural element to wrap around and encompass at least part of the one or more space objects.

Clause 9. The satellite of any of clauses 1 through 8, further comprising: a coil of electrically conductive material with a mass on one end thereof, wherein the coil is configured to release after a collision with the one or more space objects to initiate deorbiting of the satellite.

Clause 10. The satellite of any of clauses 1 through 9, wherein movement of the coil relative to a magnetic field drives a current through the coil that causes a (Lorentz) force to be generated thereby producing a drag thrust that causes the satellite to deorbit.

Clause 11. The satellite of any of clauses 1 through 10, wherein the at least one material is compressed for launch of the satellite and released to expand once in space.

Clause 12. The satellite of any of clauses 1 through 11, wherein the at least one material is formed in a shape of one or more coils, wherein each coil comprises: a length of material that is wound or arranged in a spiral configuration or as a sequence of rings, wherein each coil is oriented either: substantially parallel to a longitudinal axis defined by the interior portion, or substantially perpendicular to the longitudinal axis defined by the interior portion.

Clause 13. The satellite of any of clauses 1 through 12, wherein the first side further comprises a first thin film structure comprising a thin film antenna, and wherein the second side further comprises a second thin film structure opposite the first thin film structure, wherein the second side comprises a plurality of thin film solar cells.

Clause 14. The satellite any of clauses 1 through 13, wherein the thin film antenna comprises an electrode printed on a carrier layer, wherein the electrode that functions as an antenna element and wherein the second side further comprises: a support substrate that is configured to support the plurality of thin film solar cells, wherein the support substrate is separable from the electrode by a specific separation distance and serves as a ground plane for the antenna element.

Clause 15. The satellite any of clauses 1 through 14, wherein the first thin film structure comprises a plurality of thin film antennas configured as a phased antenna array.

Clause 16. The satellite any of clauses 1 through 15, wherein support substrate comprises: a supporting layer, wherein the plurality of thin film solar cells overlie one surface of the supporting layer; and a thin conductive layer that overlies another surface of the supporting layer, wherein the thin conductive layer serves as the ground plane of the antenna element.

Clause 17. The satellite of any of clauses 1 through 16, wherein the thin conductive layer comprises: a metalized layer, and wherein the supporting layer and the carrier layer each comprise one or more of: polyethylene terephthalate (PET) film, a nylon film, a mylar film, a polyamide film and a polyimide film.

Clause 18. The satellite of any of clauses 1 through 17, wherein the first side or the second side further comprises a thin film battery.

Clause 19. The satellite of any of clauses 1 through 14, wherein the first side is spaced apart from the second side by one or more support members upon deployment.

Clause 20. The satellite of any of clauses 1 through 19, wherein the plurality of thin film solar cells and the thin film antenna are flexible, wherein the at least one structural element is in a folded or rolled configuration prior to deployment, and wherein the one or more support members comprise: one or more inflatable elements for deploying the at least one structural element upon inflation, wherein the one or more inflatable elements cause the support substrate to be spaced apart from the electrode by the specific separation distance upon being inflated.

Clause 21. The satellite of any of clauses 1 through 20, wherein the one or more payload elements are non-releasable from the satellite when the satellite collides with the one or more space objects.

Clause 22. The satellite of any of clauses 1 through 21, wherein the satellite further comprises: a directional and attitude controller for controlling one or more of attitude, position and velocity of the satellite to cause the at least one structural element to collide with the one or more space objects, capture the one or more space objects and modify a time for the satellite to de-orbit.

Clause 23. The satellite of any of clauses 1 through 22, wherein the satellite further comprises: a propulsion system; one or more actuators; and at least one controller configured to: control attitude, position and velocity of the satellite via the propulsion system and the one or more actuators to cause the at least one structural element to collide with the one or more space objects; and after capturing the one or more space objects: cause a de-orbit of the satellite and the one or more space objects captured thereby.

Clause 24. The satellite of any of clauses 1 through 24, wherein the satellite further comprises: an attitude determination and control system (ADCS) for orienting the satellite; and a propulsion system comprising one or more actuators for controlling position and/or attitude of the satellite, and at least one controller configured to: control one or more of the ADCS and the propulsion system to cause to the at least one structural element to collide with the one or more space objects; and cause a de-orbit of the satellite after capturing the one or more space objects.

BRIEF DESCRIPTION OF THE DRAWINGS

FIG. 7A depicts an embodiment of the structural element of FIG. 3.

FIG. 7B depicts an alternative embodiment of the structural element of FIG. 3.

FIG. 7C depicts a further alternative embodiment of the structural element of FIG. 3.

FIGS. 8A through 8D depicts a first embodiment of a method by which the satellite of FIG. 1 captures space object(s).

DETAILED DESCRIPTION

Figure 1:
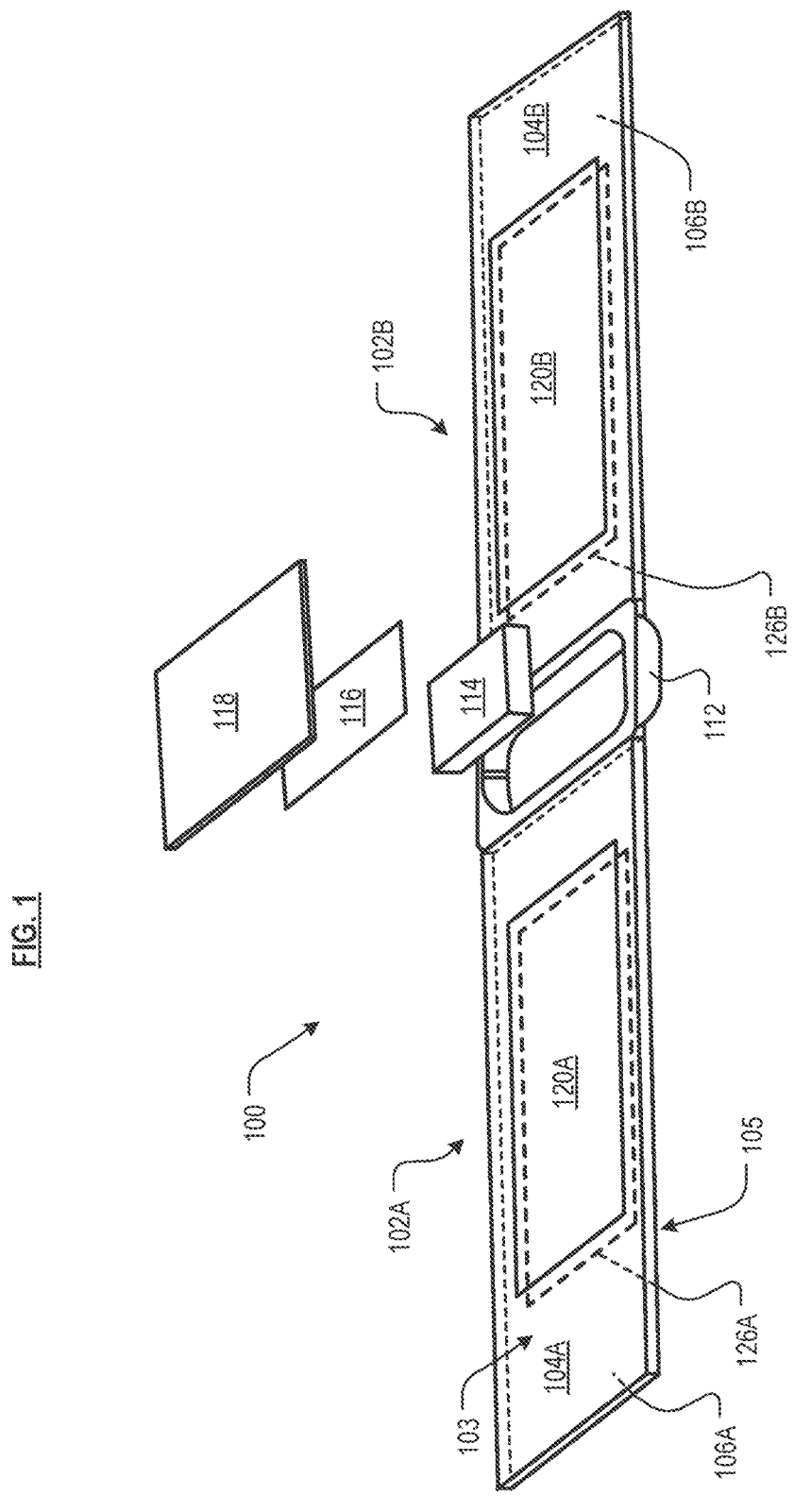
FIG. 1 illustrates a satellite in accordance with the illustrative embodiment.

FIG. 1 illustrates, via a perspective view, an example of the salient elements of satellite 100 in accordance with the illustrative embodiment. Satellite 100 includes structural elements 102A and 102B, which may also be referred to herein as "wings", pouch 112, battery 114, satellite subsystems 116, and cover 118. Pouch 112 may be centrally located between structural elements 102A and 102B, and receives battery 114, and various satellite subsystems 116. For purposes of illustration in this illustrative embodiment, the structures 102A, 102B (also referred to as wings) that are shown are one example of a "structural element" of a satellite in which the disclosed embodiments may be implemented. It should be appreciated that this implementation is non-limiting and that the concepts described herein apply to other structures or appendages that may be part of or deployed from a space vehicle or spacecraft. As such, in some non-limiting embodiments the "structural element" may be a structure referred to as a "wing" of the satellite, and therefore in such cases the terms "structural element" and "wing" may be used interchangeably herein. However, it should be appreciated that the "structural element" is not limited to being a wing of the satellite and may be any other part of the satellite that is configured to capture space objects (e.g., debris). As such, while the term "wing" may be used to describe one non-limiting embodiment, the "structural element" is not limited to being a wing of the satellite. Rather, it may encompass any portion of a satellite that is space deployable and configured to capture space objects.

Satellite subsystems 116 may include any combination of hardware, software and/or firmware to provide the functionality for implementing the capture features of a satellite as disclosed herein. As will be appreciated by those skilled in the art, the satellite includes various on-board systems such as one or more of: electrical power system (e.g., solar cells, batteries, power distribution, etc.), attitude determination/control system, actuator electronics, one or more propulsion system(s), one or more communication system, and on-board processor(s)/memory/software/data handling. A representation of those functional blocks will be described below to illustrate an example of how they might be applied in one non-limiting example. As will be described below and as will appreciated by those skilled in the art, the satellite may have various on-board systems, including at least some of the following systems, among others: an electrical power system (e.g., solar cells, batteries, power distribution, etc.), an attitude determination/control system, actuator electronics, one or more propulsion system(s), one or more communication systems, on-board processor(s)/memory/software/data handling, etc.

Satellite systems, as represented herein, may comprise of a single circuit board, the satellite subsystems 116 may include various electronics, sensors, magnetorquers, propulsion systems and like, which may be distributed throughout satellite 100. Such subsystems, which are familiar to those skilled in the art, are discussed briefly below in conjunction with FIG. 6 to maintain a focus on those features that are most germane to the present invention. Cover 118 serves as a carrying board for some of the satellite subsystems 116 and may be used for attaching satellite 100 to a dispenser, etc., during launch.

Figure 6:
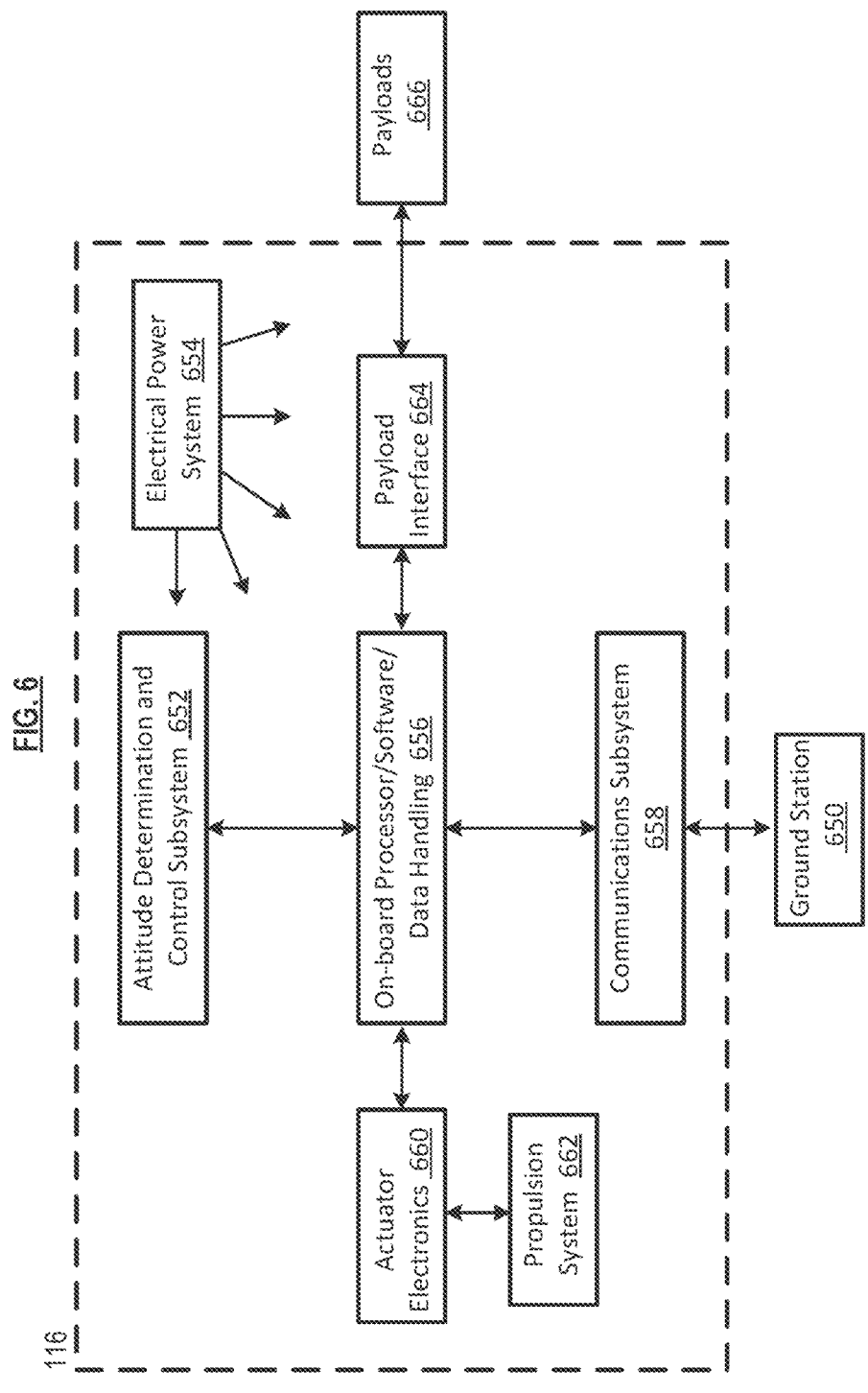
FIG. 6 depicts major subsystems of a satellite, such as the satellite of FIG. 1.

Referring now to FIG. 6, satellite subsystems 116 include attitude determination and control subsystem ("ADCS") 652, electrical power system ("EPS") 654, command and data handling subsystem 656, communications subsystem 658, actuator electronics 660, propulsion subsystem 662, payload interface 664.

ADCS 652 stabilizes satellite 100 and orients it in desired directions, addressing any external torques that would otherwise tend to undesirably alter its orientation (e.g., station keeping). The primary perturbing force on satellite 100, when in LEO, is the Earth's atmospheric drag, which applies a braking effect on the satellite. The system determines the satellite's attitude, which may refer to the process of determining the orientation and location of the satellite relative to some reference frame. This determination may be performed using sensors, such as sun sensors, star trackers, horizon sensors, accelerometers, magnetometers, gyroscopes and/or GPS. Achieving and maintaining an orientation in space may be referred to as attitude control, and this may be performed by collecting data from all the sensors, processing it, and actuating the relevant systems to correct attitude. In some embodiments, the attitude control systems are magnetically actuated in conjunction with the magnetosphere.

EPS 654 receives, stores, and distributes the power for use by satellite 100. Power may be generated via solar cell(s) and the energy may be stored in batteries, such as battery 114. The power supply voltage level may be regulated as required for satellite subsystems using dc-dc converters and low dropout regulators, and buses are used for power distribution.

Command and data handling subsystem 656 includes an on-board processor, memory, and associated unit, as well as an operating system and control software. This subsystem is responsible for controlling all functions of satellite 100. Subsystem 656 processes data from the on-board sensors and issues commands based thereon.

Communications subsystem 658 provides a link to and from ground station 650, and may provide other communications functionality in terms of mission requirements. Actuator electronics 660 include controllers, etc., for actuating various satellite subsystems, such as propulsion subsystem 662. The propulsion system for satellite 100 is typically a chemical or electrical propulsion system, as are well known in the art.

Payload interface 664 receives data/signals from satellite payloads 666, such as an antenna array.

With continuing reference to FIG. 1, structural elements 102A and 102B include two opposed sides that are illustrated in FIG. 1 as first side 103 and a second side 105. First side 103 of structural element 102A includes material layer(s) 104A and optional payload 120A. Second side 105 of structural element 102A includes material layer(s) 106A and optional payload 126A. First side 103 of structural element 102B includes material layer(s) 104B and optional payload 120B. Second side 105 of structural element 102B includes material layer(s) 106B and optional payload 126B.

Figures 2A, 2B:
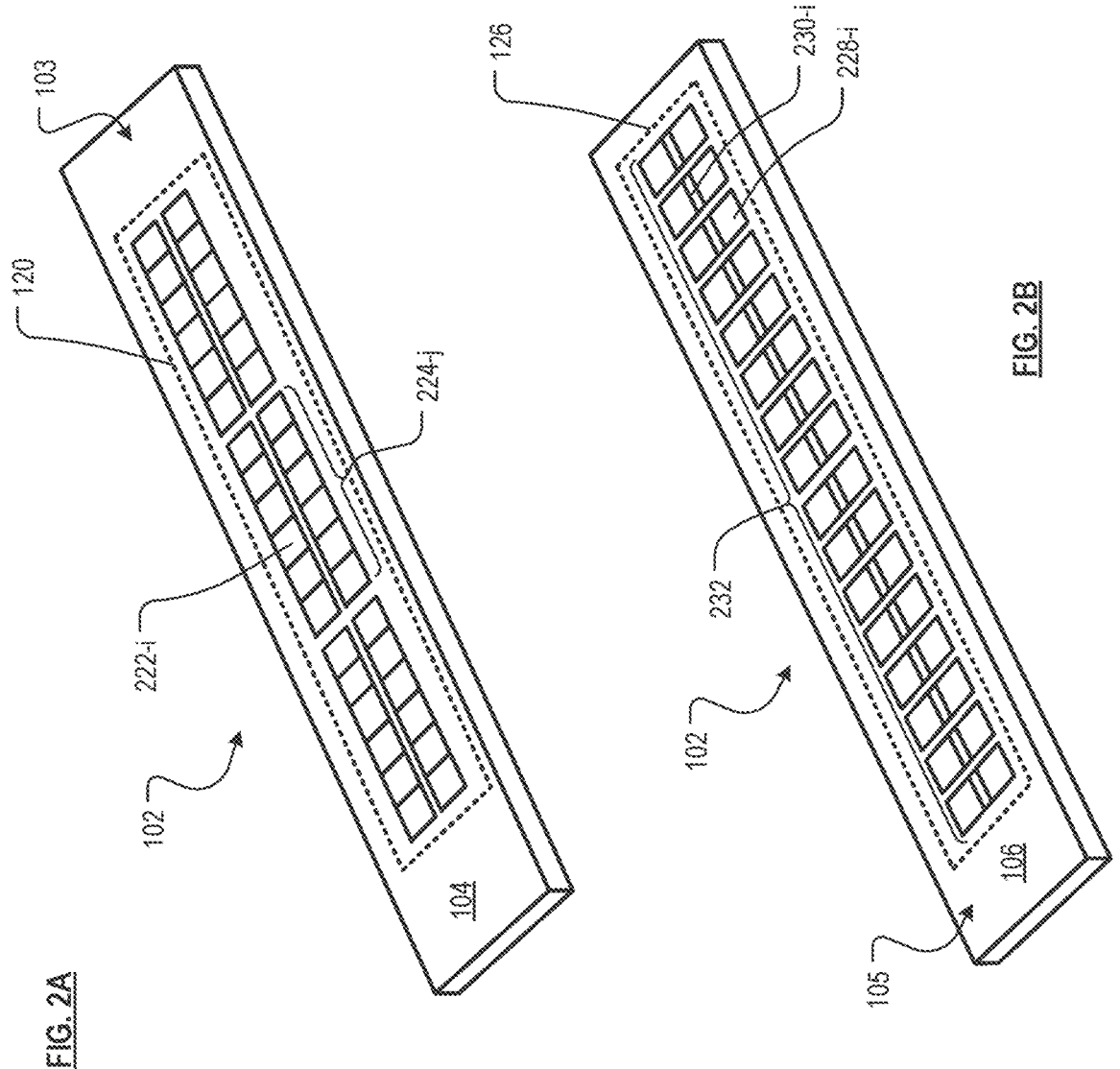
FIG. 2A illustrates an embodiment of a first surface of a structural element of the satellite of FIG. 1, the first surface supporting a payload of a plurality of thin film solar cells.
FIG. 2B illustrates an embodiment of a second surface of a structural element of the satellite of FIG. 1, the second surface supporting a payload of a plurality of thin film antenna elements.

FIGS. 2A and 2B depict illustrative embodiments of optional payloads 120A/B (collectively optional payload 120) and optional payloads 126A/B (collectively optional payload 126). For convenience, in the description that follows, the two structural elements 102A and 102B may be described together as structural element 102.

In the embodiment depicted in FIG. 2A, optional payload 120 on first side 103 includes a number of thin film solar cells 222-i, which collectively may define one or more thin film solar panels 224-j in some embodiments. Thin film solar panels are known in the art. One non-limiting example of a thin film solar panel is generally described, for example, at the following URL: https://science.howstuffworks.com/environmental/green-science/thin film-solar-cell.htm. The thin film solar cells may include any one of a number of thin film solar cell structures. The thin film solar cell structure should exhibit a relatively light weight so that it is relatively easier to bring to orbit and relatively easier to deorbit, and/or relatively inexpensive to manufacture in comparison to prior approaches. Satellites constructed in accordance with such goals can be utilized in conjunction with the embodiments described herein.

Figures 3, 4, 5:
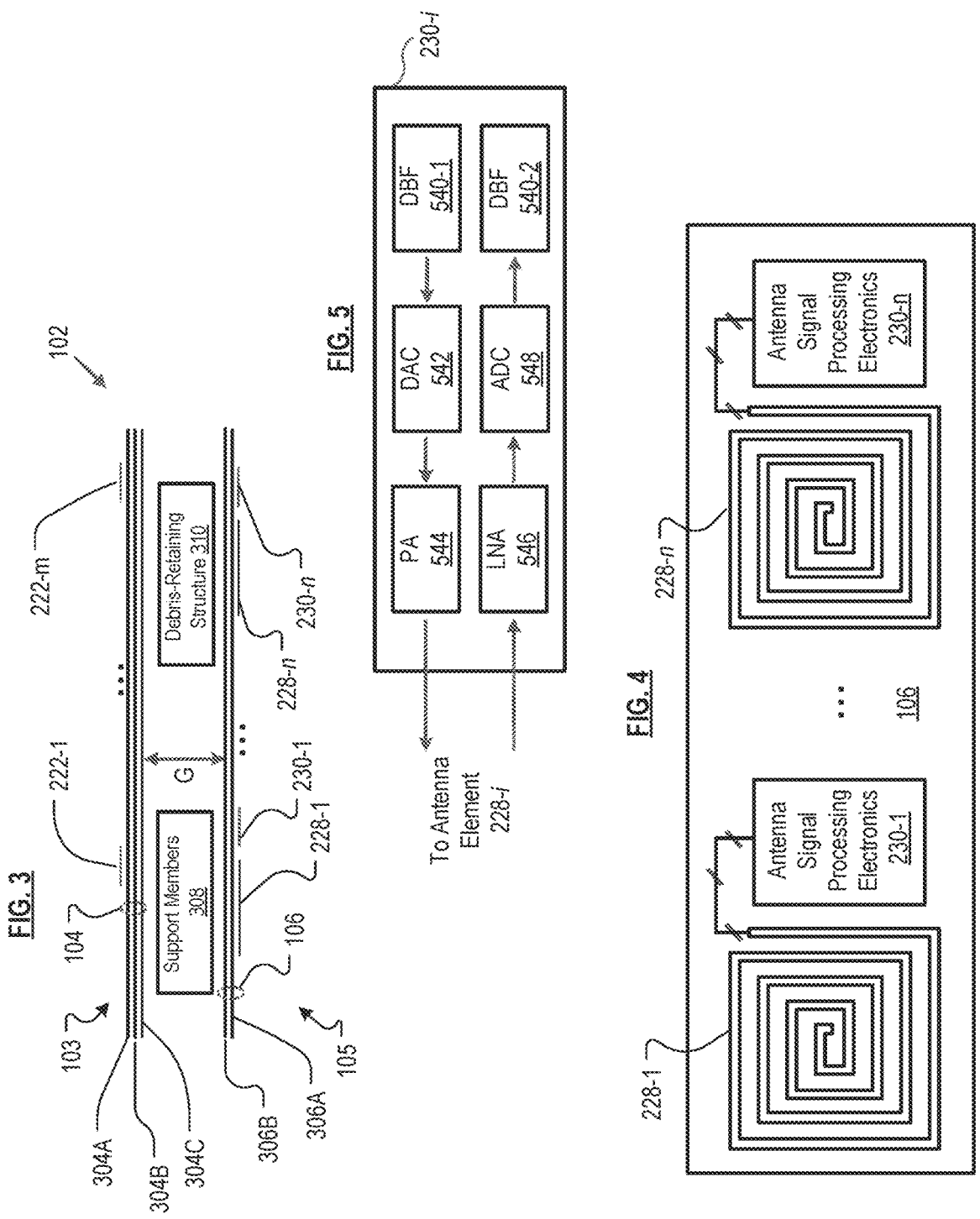
FIG. 3 illustrates a sectional view of the structural element of FIGS. 2A and 2B.
FIG. 4 illustrates an embodiment of thin film antenna elements on the second surface of the structural element.
FIG. 5 illustrates an embodiment of antenna signal processing electronics for use with the thin film antenna elements.

In the embodiment depicted in FIG. 2B, optional payload 126 on second side 105 of the structural element includes a plurality of the thin film antenna elements 228-i and signal processing electronics 230-i that is associated therewith, collectively defining a thin-film based antenna array 232. Each such thin film antenna element 228-i is capable of transmitting and/or receiving signals. Signal-processing electronics 230-i process the signals transmitted from or received by thin film antenna elements. When in space, such as in LEO, structural element 102 is normally oriented so that antenna array 232 is Earth-facing, and the thin film solar cells 222-i of the thin film solar panels 224-j are space-facing. The antenna array 232 is described in further detail in conjunction with FIGS. 3 through 5. As described in further detail in conjunction with one non-limiting embodiment that is illustrated in FIG. 3, material layer(s) 104 may include at least one layer of material that supports each of thin film solar cells 222-i, and material layer(s) 106 include at least one layer of material that supports each of the thin film antenna elements 228-i. As used herein, a "thin film" may be generally defined as a layer of material ranging from fractions of a nanometer (e.g., a monolayer) to several micrometers in thickness. In the present context, in some embodiments, at least one of the layers associated with the first and second sides of the structural element may be thin films having a thickness typically between about 1 and 250 micrometers, and may be ultralightweight, and foldable/rollable, and may further be, for example and without limitation, any of a variety of plastics, such as polyethylene, polypropylene, polyethylene terephthalate, acrylonitrile-butadiene-styrene, polyamides, etc. In some embodiments, as one non-limiting example, the thin films may be Mylar® brand stretched polyethylene terephthalate (PTE) film, available from Dupont Teijin Films US and others. For embodiments in which an electrically conductive thin film is desired/required, DuraLar™ brand metallized film from Grafix Plastics of Maple Heights, Ohio may suitably be used, as one non-limiting example.

FIG. 3 depicts, via a sectional view, a portion of structural element 102. In the illustrated embodiment, thin film solar cells 222-1 through 222-m (generally referenced as thin film solar cells "222-i") may be disposed on first side 103 of the structural element, and thin film antenna elements 228-1 through 228-n (generally referenced as thin film antenna elements "228-i") as well as signal processing electronics 230-1 through 230-n (generally referenced signal processing electronics "230-i") may be disposed on second side 105 of the structural element.

In one embodiment, the thin film antenna elements 228-i can be implemented as a very thin, flat "patch" of an electrically conductive material that, in the illustrative embodiment, is formed on one of the thin films composing material layer(s) 106. As described in further detail below in conjunction with FIG. 4, in some embodiments, the electrodes of each thin film antenna element 228-i can be printed using an electrically conductive ink. In some other embodiments, the electrodes of each of each thin film antenna element 228-i may be stamped on one of layers composing material layer(s) 106, and could be located on either side of such a layer. In either embodiment, because the thin film layer on which thin film antenna elements 228-i are formed is a flexible material, either approach results in a flexible, thin film, antenna array 232 (see FIG. 2B) on second side 105 of structural element 102.

In some embodiments, thin film antenna elements 228-i have a thickness of between about 1 and 250 microns. The thin film antenna elements may be flexible and can be bent or rolled without deformation that impacts the ability to operate within the antenna parameters they are designed for upon being deployed (e.g., from a folded or rolled configuration). For instance, in some implementations, the thin film antenna elements 228-$i$ have a flexural modulus of between about 35 and about 60 megapascals when fabricated with appropriate dimensions. As such, the thin film antenna elements 228-$i$ may be highly deformable during storage without impacting desired performance characteristics once they are deployed. The thin film antenna elements 228-$i$ (or "electrodes") can be made from a wide variety of electrically conductive materials that may also be flexible and capable of achieving the required performance characteristics in a given implementation. Two non-limiting examples of electrically conductive materials suitable for making the thin film antenna elements 228-$i$ (or "electrodes") can include aluminum and silver. Those skilled in the art will appreciate that other conductive materials, or combinations thereof, can be used. The shape of the electrodes can vary depending on the implementation, as discussed below in conjunction with FIG. 4.

Thin film antenna elements 228-$i$ and the electrodes of those antenna elements can have any one of variety of shapes (e.g., spiral, rectangular, square, circular, include cut outs, etc.) and sizes. As non-limiting examples, the electrode may have a spiral shape (e.g., a circular or rectangular spiral), a spherical shape, a flat planar shape, etc. The antennas that make up the array can be patch antennas that have any of these shapes, and can thus be characterized as one or more of a spiral antenna, a spherical antenna, a patch antenna, etc. depending on the implementation.

In the embodiment illustrated in FIG. 4, the thin film antenna elements 228-1 to 228-$n$ are in the form of a rectangular spiral patch, but alternative configurations, such as circular, etc., can be utilized depending on the implementation. In other implementations not shown in FIG. 4, the antenna can have a spherical structure. Both the shape and size of the thin film antenna element affect various antenna characteristics, such as the antenna's resonate frequency, polarization, radiation pattern, and impedance. In some other embodiments, the elements have a 3D shape, with material placed in different Z-dimension locations, as compared to the aforementioned flat patch element, which typically has a single thickness of material and such element may also fold, compress or otherwise offer flexibility between a flat stowed position and its position for use. It is within the capabilities of those skilled in the art of antenna design to calculate the size and shape of an antenna element for any particular frequency and/or gain requirement.

In the illustrative embodiment, thin film antenna elements 228-$i$ can be printed on material layer(s) 106 utilizing any known methods. For example, in some embodiments, thin film antenna elements 228-$i$ can be formed using an electrically conductive ink that may be printed or stamped onto material layer(s) 106. In some embodiments, the electrically conductive ink includes a polymer thick film (PTF) containing electrically conductive material, such as silver flakes or graphite. Any formulation that provides an electrically conductive ink, as known to those skilled in the art, may suitably be used. The thickness of such printed thin film antenna elements 228-$i$ may be, for example, in a range of about 1 to about 250 microns. In some other embodiments, a very thin piece (e.g., about 1 to about 250 microns) of electrically conductive material such as aluminum, copper, silver, etc., can be fabricated (e.g., cut into pieces using a die cutter, laser cutter, etc.) to have a desired shape and size, and can then be adhered or otherwise attached to material layer(s) 106.

Thin film antenna elements 228-$i$ may be either directly or indirectly electrically coupled to signal processing electronics, as is known in the art. In the illustrative embodiment depicted in FIGS. 2B, 3 and 4, each thin film antenna element 228-$i$ may be electrically coupled to an instance of signal processing electronics 230-$i$. In the illustrative embodiment, signal processing electronics 230-$i$ may be formed on material layer(s) 106 in the same fashion as thin film antenna elements 228-$i$ (e.g., printed or stamped). Although illustrated as being spaced apart from material layer(s) 106 for clarity, the various instances of signal processing electronics 230-$i$ may be disposed on the surface material layer(s) 106.

In the illustrative embodiment, signal processing electronics 230-$i$ includes radio frequency front end (RFFE) circuitry for amplifying an RF signal radiated from each thin film antenna element 228-$i$, and for amplifying an RF signal that is received by each thin film antenna element 228-$i$. In other embodiments multiple antenna elements may be grouped together to create a sub-array, and such sub-arrays would be connected as noted to the signal processing electronics. It may be desirable for this circuitry to be as close to the thin film antenna elements 228-$i$ as is practical.

In the illustrative embodiment, and as illustrated in FIG. 5, the transmit circuitry includes digital beam former 540-1, digital-to-analog converter 542, and power amplifier 544. The receive circuitry includes low-noise amplifier 546, analog-to-digital converter 548, and digital beam former 540-2. It is within the capabilities of those skilled in the art to design, build, and operate signal processing electronics 230-$i$.

In some embodiments, multiple thin film antenna elements 228-$i$, which may be connected to multiple instances of signal processing electronics 230-$i$, may be coupled to one another and configured as a phased-array antenna.

The greater the number of thin film antenna elements 228-$i$, the larger the physical size of the antenna and the more directivity and/or gain the antenna will have. Directivity is an important end-state metric used to describe the focusing power of an antenna, and higher gains are often highly desirable. Thus, a goal in many applications is to have an array with as many antenna elements as possible to create the highest directivity.

In some embodiments, signal processing electronics 230-$i$ may also include (i) a modem and (ii) other circuitry to modulate or demodulate a signal into a signal that may be stored on memory, connected to a computer for data transfer, or any other use.

Each thin film antenna element 228-$i$ includes a feed system, which electrically couples it to signal processing electronics 230-$i$. The feed system can be, for example and without limitation, a microstrip line, coaxial probe, aperture coupled feed, or proximity coupled feed, and it is within the capabilities of those skilled in the art to design a feed system for embodiments of the invention. In some embodiments, the feed line comprises electrically conductive ink or foil.

In some embodiments, battery 114 may be implemented as a plurality of thin-film batteries, which may be embedded into, or included on either material layer(s) 104 and/or 106.

Returning to the discussion of FIG. 3, in the non-limiting embodiment which is illustrated in FIG. 3, material layer(s) 104 on first side 103 may include three thin film layers, which are referred to below as support substrate 304A, electrically conductive layer 304B, and ballistic layer 304C, and material layer(s) 106 on side 105 may include tow thin film layers, which are referred to below as carrier layer 306A, and ballistic layer 306B. In other embodiments, each of the materials layer(s) 104 and 106 may include a different number of layers (e.g., fewer layers or more layers) than depicted in FIG. 3. In operation, the two sides 103, 105 may be separated by gap G. Structural element 102 may also include support members 308 and material that makes up or comprises a debris-retaining structure 310 that may also be referred to as a "debris-capture material" herein. The material that makes up or comprises the debris-retaining structure 310 may be an energy absorbing material, and the material layers may be substantially planar materials spaced apart by the energy absorbing material.

In the non-limiting illustrative embodiment, material layer(s) 104 includes three layers, as noted above. Support substrate 304A can be any type of backing material suitable for supporting the thin film solar cells 222-*i*. Depending on the implementation, support substrate 304A can be made of, or can include, an ultra-thin, ultralightweight, and foldable substrate material, such as any of a variety of plastics (e.g., polyethylene, polypropylene, acrylonitrile-butadiene-styrene, etc.). In an illustrative embodiment, support substrate 304A may be Mylar® brand stretched polyethylene terephthalate (PTE) film, available from Dupont Teijin Films US and others. Support substrate 304A is a thin film layer having a thickness that is typically, but not necessarily, between about 1 and 250 microns.

In addition to supporting thin film solar cells 222-*i*, in some embodiments, material layer(s) 104 functions as a ground plane for thin film antenna elements 228-*i*. When acting as the ground plane for the thin film antenna elements 228-*i*, support substrate 304A presents an electrically conductive surface. For example, in some embodiments, support substrate 304A may be made of an electrically conductive material. By way of example, support substrate 304A can be made from DuraLar™ brand metallized film from Grafix Plastics of Maple Heights, Ohio. Alternatively, in some other embodiments, if support substrate 304A is not electrically conductive, it can be rendered electrically conductive by additives (e.g., electrically conductive dopants, etc.) to its formulation.

And in yet some further embodiments, as depicted in FIG. 3, electrical conductivity may be provided by a separate, electrically conductive layer 304B. In some embodiments, the electrically conductive layer 304B may be a foil of an electrically conductive material, such as aluminum or copper, typically having a thickness in a range of about 25 to about 130 microns. The foil can be printed (using low-cost screen printing) or could be adhered (e.g., vacuum deposited or laminated) to the "underside" of support substrate 304A. In some other embodiments, the electrically conductive foil is used without support substrate 304A. Although depicted in FIG. 3 as being spaced-apart from support substrate 304A for pedagogical purposes, electrically conductive layer 304B may abut support substrate 304A.

In some embodiments, layer 304C of material layer(s) 104 may be a ballistic layer. Although one such layer is depicted in the embodiment of FIG. 3, in other embodiments, additional ballistic layers may be present. Examples of suitable ballistic materials for the ballistic layer may include, without limitation, an aramid-based (aromatic polyamide) material (e.g., Kevlar®, Twaron®, etc.), a high-density polyethylene (HDPE) material, high-performance polyethylene (HPPE), or an ultra-high molecular weight polyethylene (UHMWPE) material (e.g., Dyneema®). In some embodiments, the layers of ballistic material may include a protective layer or coating to help prevent degradation or decomposition of the ballistic material caused by UV radiation, such as due to incoming sunlight. Although depicted below electrically conductive layer 304B and support substrate 304A, ballistic layer 304C can serve as the support layer for thin film solar cells 222-*i*. Moreover, if implemented as a mesh (such that sufficient sunlight reaches the thin film solar cells 222-*i*), ballistic layer 304C can be disposed on top of the solar cells.

Although FIG. 3 depicts an embodiment in which thin film solar cells 222-*i* may be disposed on one side on the exterior facing surface of support substrate 304A, in some other embodiments, the solar cells can be disposed on the other side of support substrate 304A. Location depends on desired antenna performance and the use of support substrate 304A as a protective barrier for the solar panels from UV radiation.

In the non-limiting embodiment that is illustrated in FIG. 3, material layer(s) 106 includes two layers. Carrier layer 306A is a thin film layer on which thin film antenna elements 228-*i* and signal processing electronic 230-*i* may be supported. In some embodiments, carrier layer 306A comprises an ultralightweight, and flexible substrate material, such as any of a variety of plastics (e.g., polyethylene, polypropylene, polyethylene terephthalate, acrylonitrile-butadiene-styrene, polyamides, polyimides, etc.). In some embodiments, carrier layer 306A may be Mylar® brand stretched polyethylene terephthalate (PTE) film, available from Dupont Teijin Films US and others. Typically, but not necessarily, carrier layer 306A has a thickness in a range of about 1 to about 250 microns.

In some embodiments, ballistic layer 306B may be made of a material like any of those described with reference to ballistic layer 304C. For example, in some embodiments, this layer may comprise a thin layer of Kevlar® or Twaron® (aramid synthetic fiber, such as available from Dupont) Dyneema® (ultra-high-molecular weight polyethylene), and/or other materials used for ballistic applications. Although depicted "inward" of carrier layer 306A, in some other embodiments, ballistic layer 306B can be the outer most layer of material layer(s) 106. Moreover, although not illustrated, in some non-limiting embodiments, ballistic layer 306B can serve as the carrier layer for thin film antenna elements 228-*i*. In these embodiments, material layer(s) 106 can include or consist of only a single ballistic layer 306B.

In some embodiments, at least some of thin films composing material layer(s) 104 and/or 106 may be treated to alter albedo (e.g., reflectivity) at select regions. With such regions of relatively lower and relatively higher albedo, the temperature of the satellite can be controlled by altering the attitude of satellite. More particularly, if the temperature of the satellite drops based below a desired temperature based on the attitude of the satellite and its resulting orientation with respect to the sun, the satellite's attitude may then be altered to increase the exposure of relatively lower albedo regions of the structural element to the sun. This causes the satellite to absorb more energy, such that the desired temperature can be maintained. Conversely, if the temperature of the satellite increases due to the attitude of the satellite and its resulting orientation with respect to the sun, the satellite's attitude may be altered to increase the exposure of the relatively higher albedo regions of the structural element to the sun. This may cause the satellite to reflect more energy, such that the desired temperature may be maintained.

It is notable that in some embodiments, prior to deployment of satellite 100, the ground plane, such as realized by one of the layers of material layer(s) 104, and layer of material layer(s) 106, serving as the carrier layer for thin film antenna elements 228-*i*, may not be separated by this specific separation distance. For example, as previously discussed, prior to deployment, the material layer(s) 104 and 106 may be in a folded or rolled state. In fact, because structural element 102 is flexible and highly compactable, it can be rolled or folded in multiple directions and multiple times as a function of the overall size of material layer(s) 104 and 106. For example, in some embodiments, structural element 102 can be compacted to a thickness of less than 0.25 inches, in a "stow" state. Because of its construction, structural element 102 has negligible mass in addition to stowing to a very small size. Yet, in fully deployed mode, antenna array 232 incorporated therein may exhibit very high directivity and gain.

When the satellite is deployed, the two sides 103,105 may be separated by gap G, as illustrated in FIG. 3. The gap G may serve several purposes, as a function of satellite capabilities.

One purpose for gap G is to facilitate establishing a ground plane, such as for some embodiments in which satellite 100 includes antenna array 232. More particularly, thin film antenna elements 228-1 to 228-n should be separated from the ground plane, which in the illustrated embodiment is electrically conductive layer 304B, by a specific separation distance. As such, gap G between that layer and the specific material layer(s) 106 that supports the antenna elements should be set to the specific separation distance. The presence of the ground plan can result in relatively improved antenna efficiency, particularly in some low-frequency implementations (e.g., below 1 gigahertz).

As discussed further below, during deployment of the satellite 100, gap G may be established via one of several approaches.

In some embodiments, support members, such as support members 308, may be used for deploying structural element 102 and establishing gap G. In some embodiments, support members 308 may be embodied as inflatable elements, which may be positioned along the long edges of material layer(s) 104 and 106. In some embodiments, these inflatable elements can be "tubes" of material, such as the same material as the layer of material layer(s) 104 and 106 that support, for example, thin film solar cells 222-i and/or thin film antenna elements 228-i. Support members 308 cause the structural element to deploy from its stowed state, and establish the separation between the two sides 103, 105 of structural element 102.

In some other embodiments, first side 103 and second side 105 of structural element 102 may be two major surfaces of a continuous sheet (or of several continuous sheets) wrapped around (or otherwise seamed and appropriately sealed) to form a gas-tight seal and enclose an inflatable volume, like a "float" or "raft" for use in a swimming pool. Thus, inflating the inflatable volume causes structural element 102 to deploy from its stowed state and causes first side 103 and second side 105 thereof to separate the appropriate distance from one another.

In some yet further embodiments, support members 308 may include various implementations of wires, threads, standoffs, or mechanical linkages, such as may be located between material layer(s) 104 and 106. The emphasis for such embodiments is on simplicity of structure and light weight.

For example, in some non-limiting embodiments, support members 308 can be made of a shape memory alloy (SMA) material, such as a wire comprising nitinol (nickel-titanium) or other suitable shape memory alloys (e.g., copper-aluminum-nickel, etc.). Such wires can be "trained" to extend from an initially compact (stowed) configuration, thereby deploying the structural element and appropriately separating the two sides thereof. In some embodiments, an electrical current can be used to stimulate the SMA material.

In some other embodiments, support members 308 can be a lightweight (e.g., composite material, etc.) helical springs or coils. Such springs/coils may be compressed prior to launch and then released to expand, thereby separating the two sides of the structural element when the satellite is in orbit. In yet some further embodiments, a simple mechanical linkage, such as a telescoping arrangement of hollow plastic rods, can be actuated to deploy the structural element and separate the first and second sides thereof from one another.

In some further embodiments, support members 308 can be an assemblage of co-aligned or non-aligned fibers. And in yet some additional embodiments, a foam, which may be compressed prior to launch, can be released to expand to separate the first and second sides from one another. Alternatively, the foam can be generated when the satellite is deployed. As discussed further below, in some embodiments, in addition to separating the two sides of the structural element, the support members may serve as the material of the debris-retaining structure.

In embodiments of the satellite that include inflatable elements, the satellite can include inflation means for causing the inflatable elements to inflate. Inflation means can be implemented in a variety of ways, including, without limitation, igniters that ignite one or more propellants to generate a gas for inflating the appropriate portions of the satellite. If plural propellants are used, the propellants can be ignited in series, or in parallel. Ignition materials for igniters include nitroguanidine, phase-stabilized ammonium nitrate, or other nonmetallic oxidizers, and a nitrogen-rich fuel.

In some other embodiments, a small pressure vessel that is mounted to the satellite may be filled with a fluid at sea-level pressure, and may release fluid to maintain the satellite at a certain pressure. A relief valve can be fluidically coupled to the inflatable regions of the satellite to release fluid to address over-pressure situations, as may occur in higher heat environments. In such embodiments, the life of the satellite would be limited to the amount of fluid stored on the satellite.

In some additional embodiments, a pair of one-way valves may be mounted in a pressure vessel that may be located either internal or external to the satellite. In some embodiments, the pressure vessel has a small compressor motor for compressing the fluid from the satellite (and through one of the one-way valves) into the pressure vessel. This would occur only in extreme heat, and when the pressure in the satellite is above the nominal operation pressure. When the satellite is in a cold environment, the one-way valve controlling flow into the inflatable regions of the satellite releases fluid to increase the satellite's pressure to the nominal operating pressure.

In yet some further embodiments, a method that avoids the use of valves, pressure vessels, and external components is used. Because the pressure on the ground is approximately 100,000 Pa, while the pressure in Low Earth Orbit is approximately $10^{-4}$ to $10^{-8}$ Pascals, gas inside the inflatable portions of the satellite will naturally expand with altitude. Prior to launch, such portions of the satellite may be fully deflated and packed in such a way as to prevent expansion. A precise amount of fluid is injected into inflatable regions. The fluid, which could be air, nitrogen or other fluid, can then increase the pressure within the satellites as they move to lower (ambient) pressure environments. In some embodiments, one or more one-way release valves can be incorporated to prevent over inflation.

In addition to the use of elements to separate the two sides of the structural element, in some embodiments, the structural element includes one or more "cross members" disposed along one or more surfaces thereof. In some of such embodiments, inflatable elements of the structural element, and/or the thin film associated with one or both sides the structural element can be treated with a UV-curable material, which hardens upon exposure to ultraviolet radiation, increasing the structural rigidity of the structural element. UV curable material may be applied, for example, as a plurality of spaced-apart, narrow strips (e.g., a few centimeters wide, etc.) on one or both of material layer(s) 104 and 106.

In some embodiments, structural element 102 also includes other rigidity enhancing features. For example, in some embodiments, cross members (not illustrated), extend between support member 308 when embodied as inflatable tubes, to keep the inflatable tubes appropriately spaced apart, so as to keep material layer(s) 104 and 106 taut. In some embodiments, the cross members may be inflatable elements, which can be disposed on the outward-facing surface of either material layer(s) 104 and 106.

Another purpose for gap G between the two sides 103,105 of structural element 102 is to facilitate the capture of the space object(s). To aid in such capture, material of the debris-retaining structure 310 (illustrated in FIG. 3) or "debris-capture material" may be disposed between material layer(s) 104 and 106.

More particularly, material of the debris-retaining structure 310 (or "debris-capture material") disposed within the interior region of structural element 102 may be designed to absorb energy over time during a collision process with each of the space object(s). In this regard, material of the debris-retaining structure 310 may be made of energy-absorbing materials and/or may have an energy-absorbing structure. Material of the debris-retaining structure 310 can vary depending on the implementation, and may include one or more of: fibrous material, fabric material (e.g., a woven or threaded material), filaments of material, material having mesh-like structure including a grid having a number of openings; material having a lattice structure, material having a spring-like structure, etc.

In some additional embodiments, material of the debris-retaining structure 310 (or "debris-capture material") may include nanomaterials, such as carbon nanofibers (CNFs), carbon nanotubes (CNTs), and the like. CNTs are nanoscale hollow tubes (e.g., cylinder-shaped allotropic forms of carbon) composed of carbon atoms (e.g., formed by two-dimensional hexagonal lattice of carbon atoms). CNTs are extremely thin in relation to their length (e.g., have a very high aspect ratio, typically greater than 1000), possess ultra-high strength (e.g., have a mechanical tensile strength that can be 400 times that of steel), while being a relatively low-weight material (e.g., having a density that may be one sixth of that of steel) and highly electrically conductive.

In some embodiments, material of the debris-retaining structure 310 may include deformable material(s) disposed in different cross-sectional planes of the interior region, such that different portions of the deformable material(s) come into contact with, and absorb energy of the space object(s) at, different time instants during the collision process with each of the space object(s).

FIGS. 7A through 7C depict a few examples of a debris-retaining structure 310. These figures depict a sectional view of several embodiments of structural element 102, including material layer(s) 104 and 106, supported by inflatable tubes 708, which are embodiments of support member 308, as previously discussed. Tubes 708 may be inflated with gas 768. Payloads (e.g., solar cells, antenna elements, etc.) are not depicted for simplicity of illustration.

In some embodiments, such as depicted in FIG. 7A, structural element 102-1 includes material of the debris-retaining structure 310 embodied as fibrous material 710-1, disposed in region 770 between material layer(s) 104 and 106. Fibrous material 710-1 may be, for example and without limitation, carbon fiber, natural fibers, aramid, glass fibers, polymer filaments, etc. The fibers can be in the form of individual strands, or woven material. In the embodiment depicted in FIG. 7A, the fibers are non-aligned; in some other embodiments they are aligned or co-aligned.

In some other embodiments, such as depicted in FIG. 7B, structural element 102-2 includes a debris-retaining structure 310 that may be embodied as a plurality of helical springs or coils 710-2, akin to "bed springs." In the embodiment depicted in FIG. 7B, coils 710-2 may be oriented so that the long axis of each of the coils is perpendicular to material layer(s) 104 and 106.

In another embodiment depicted in FIG. 7C, structural element 102-3 includes the debris-retaining structure 310 embodied as a plurality of helical springs or coils 710-2, but in this embodiment the helical springs or coils 710-2 may be oriented with their long axis parallel to the surface of the layers of material layer(s) 104 and 106.

Coils 710-2, if formed from metal, can be compressed for launch and released to expand once in space by any number of conventional mechanisms. Alternatively, coils 710-2 can be formed from a shape-memory alloy, wherein they transform to the expanded coil shape on exposure the low temperature of space. In some further embodiments, coils 710-2 may be inflatable.

In some embodiments, support members 308 and the material of the debris-retaining structure 310 can be the same structures (e.g., fibers, coils, etc.), and, as such, these materials serve the dual purpose of (i) establishing the requisite separation between the two sides of the structural element, and (ii) functioning as the material of the debris-retaining structure.

As simplified for pedagogical purposes, there are at least two methods by which structural element(s) 102 capture space object(s). These methods will be described in conjunction with FIGS. 8A through 8D and FIGS. 9A through 9D. Although presented as distinct methods, the actual capture operation may be an amalgamation of these two methods, as a function of the relative velocities of the space object(s) and satellite 100, the size of structural element(s) 102 relative to the size of the space object(s), the shape of the space object(s), and surface roughness of the space object(s), among any other factors. After describing the methods depicted in FIGS. 8A through 8D and 9A through 9D, a description of the amalgamated method is presented.

Figures 8A, 8B:
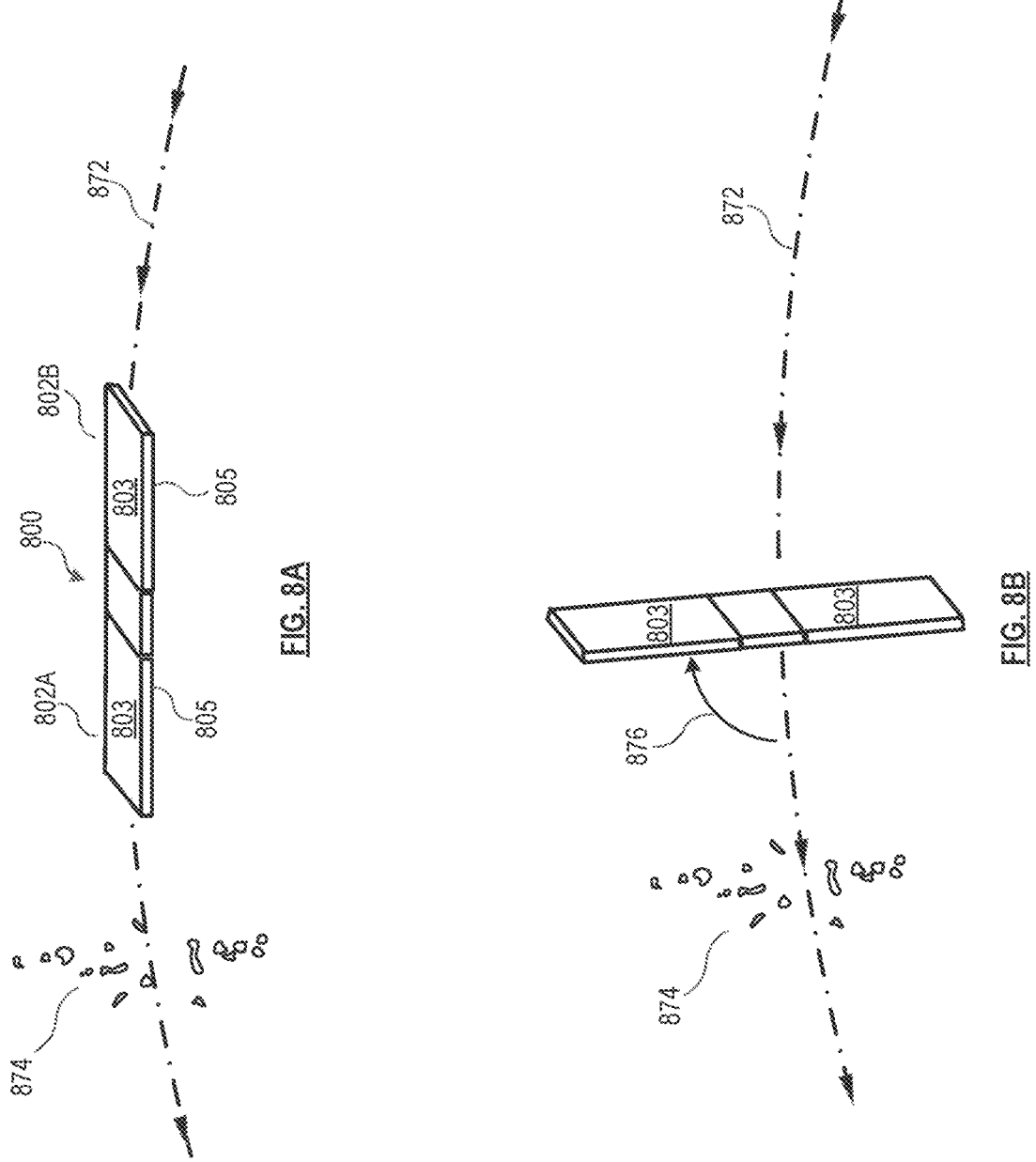

Referring now to FIG. 8A, satellite 800 having structural elements 802A and 802B may be traveling along orbital path 872. Space object(s) 874 may also be in orbital path 872 as well. The space object(s) includes a plurality of very small pieces of debris, such as about 1 centimeter in length. In FIG. 8A, the long axis of structural elements 802A and 802B are aligned with the in-track direction, and a side including broad (major) surface 803 (such as may be bearing solar cells), and another side including broad (major) surface 805 (such as may be bearing antenna elements) may be directed toward space and the Earth, respectively. A ground-based tracking network determines that space object(s) 874 is also traveling along orbital path 872. A ground station in communication with satellite 800 transmits a command for the satellite to alter its attitude for capture operations.

Referring now to FIG. 8B, satellite 800 alters its attitude so that a major surface 805 of the structural elements may be presented to space object(s) 874. To this end, the satellite includes a propulsion system, one or more actuators, and one or more controller(s).

In the non-limiting scenario depicted in FIG. 8B, major surface 805 may be rotated out of the plane of orbital path 872 by an angle 876 of about 90 degrees in this non-limiting illustration. Depending on the spread and location of space object(s) 874, satellite 800 could further be rotated such that the long axis of the structural elements is directed into/out of the page in FIG. 8B, as opposed to "up" and "down" in that figure. It will be appreciated that although limited to two dimensions in the Figures, the satellite has six mechanical degrees of freedom of movement in three-dimensional space. Specifically, the satellite can change position forward/backward (surge), up/down (heave), left/right (sway) in three perpendicular axes, combined with changes in orientation through rotation about three perpendicular axes, yaw (normal axis), pitch (transverse axis), and roll (longitudinal axis). Thus, there are a variety of ways other than those illustrated by which the satellite can move to achieve a final desired attitude.

FIG. 8C depicts satellite 800 continuing its approach to space object(s) 874. FIG. 8D depicts satellite after capture of space object(s) 874, where the relatively small space object(s) are trapped between sides by the debris-capture material disposed in satellite.

To effect capture, the controller(s), in conjunction with the propulsion system and the actuators, control attitude, position and the velocity of the satellite. The satellite may then be de-orbited to burn-up in the Earth's atmosphere. In some embodiments, the satellite includes a long coil of electrically conductive material with a mass on its end. In preparation for de-orbiting, the long coil may be released, which acts as an electrodynamic tether. The flow of electrons through the length of the tether, in the presence of the Earth's magnetic field, creates a force that produces a drag thrust that facilitates de-orbiting the satellite.

Figures 9A, 9B:
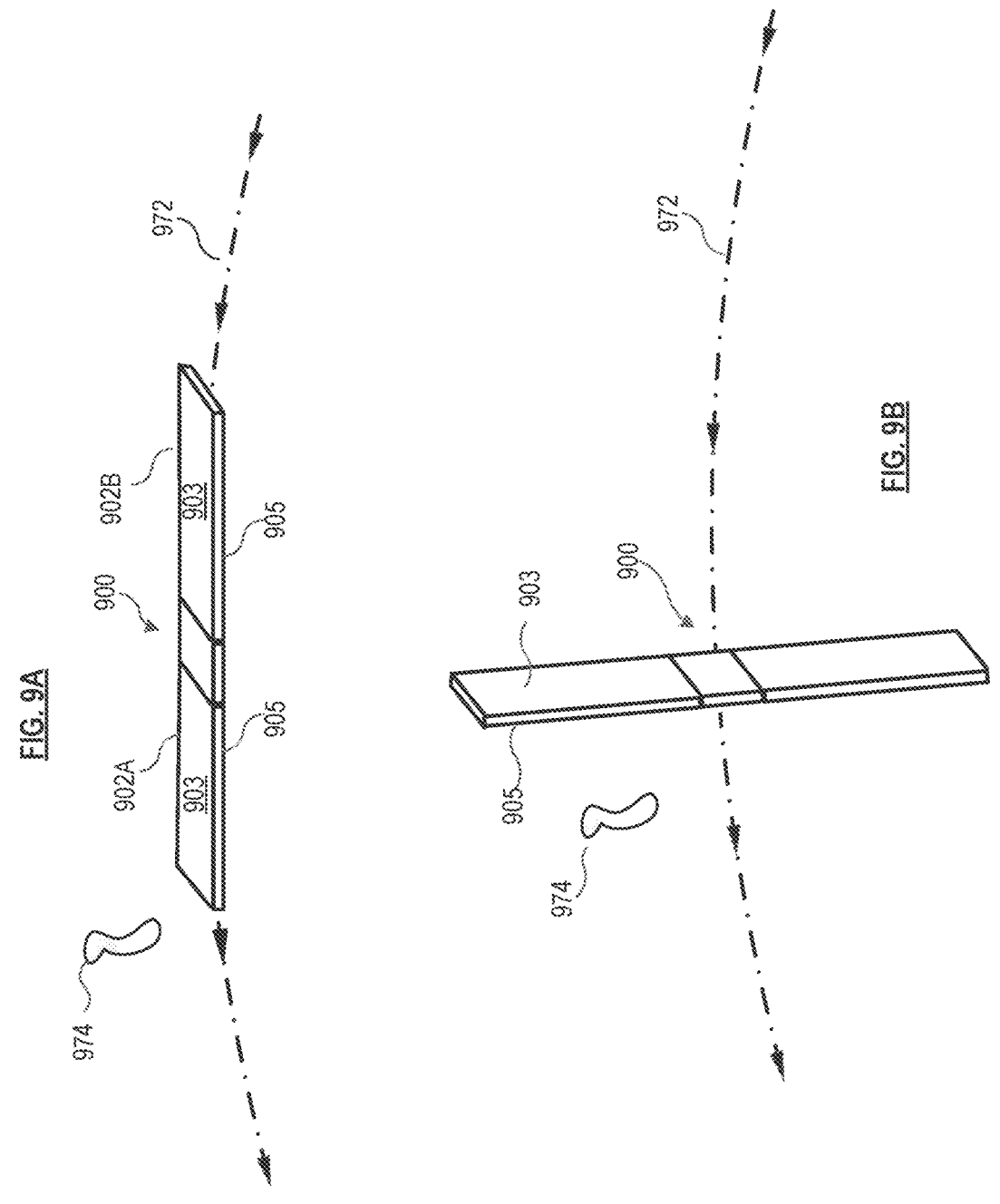
FIGS. 9A through 9D depicts a second embodiment of a method by which the satellite of FIG. 1 captures space object(s).

FIGS. 9A through 9D depicts a second method by which a satellite in accordance with the present teachings can capture space object(s). Referring now to FIG. 9A, satellite 900 having structural elements 902A and 902B is traveling along orbital path 972. Space object 974 is in orbital path 972 as well. In this non-limiting example, the space object(s) is a single relatively large piece of debris, about 1.5 meters in length. In FIG. 9A, the long axis of structural elements 902A and 902B may be aligned with the in-track direction, and broad (major) surface 903 (such as may be bearing solar cells), and broad (major) surface 905 (such as may be bearing antenna elements) may be directed toward space and the Earth, respectively. A ground-based tracking network determines that space object 974 is also traveling along orbital path 972. A ground station that is in communication with satellite 900 transmits a command for the satellite to alter its attitude for capture operations.

Referring now to FIG. 9B, satellite alters its attitude so that a major surface 905 of the structural elements is presented to space object(s) 974. In the scenario depicted in FIG. 9B, major surface 905 is rotated out of the plane of orbital path 972 by about 90 degrees. Depending on the spread and location of space object(s) 974, satellite 900 could be further rotated such that the long axis of the structural elements is directed into/out of the page in FIG. 9B, as opposed to "up" and "down" in that figure.

Figures 9C, 9D:
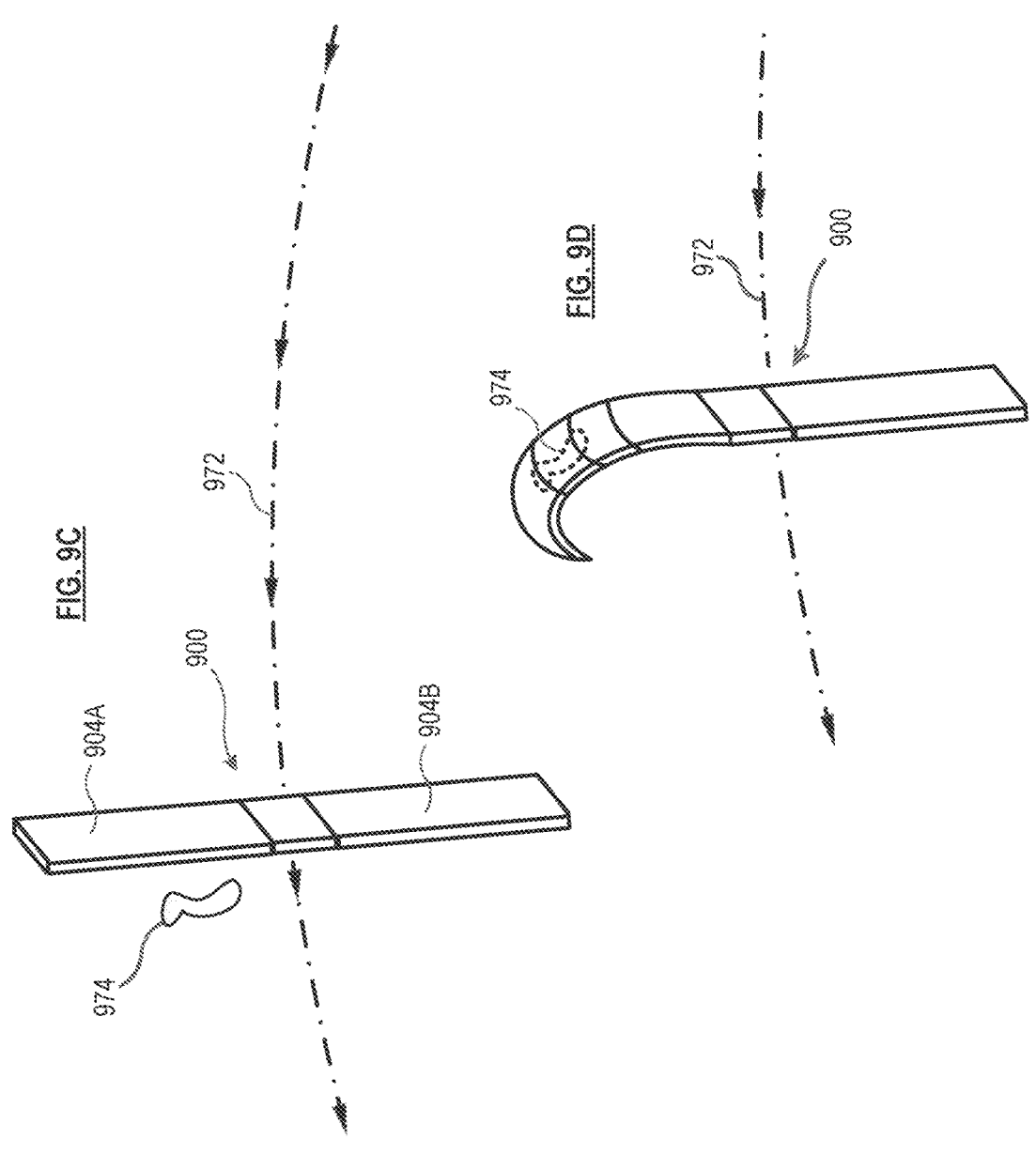

FIG. 9C depicts satellite 900 continuing its approach to space object(s) 974. FIG. 9D depicts satellite after capture of space object(s) 974, wherein the relatively large object is enveloped by the "upper" structural element. The satellite is then de-orbited to burn-up in the Earth's atmosphere. As previously noted, in some embodiments, the satellite includes a long coil of electrically conductive material with a mass on its end, which functions as an electrodynamic tether to create a drag thrust and facilitate de-orbiting satellite.

As previously noted, the specifics of the capture operation are a function of a number of parameters, and the capture operation itself might involve aspects of both of the methods depicted in FIGS. 8A through 8D and in FIGS. 9A through 9D. More particularly, when space object(s) impacts one of the major surfaces of the structural element, a portion of it may pierce the material layer(s) 104 or 106, and be snared by the fibers of the ballistic film(s) included in those layers (e.g., FIG. 3: ballistic layer 304C, ballistic layer 306B, etc.). Debris-debris-retaining structure 310 (e.g., woven thread, or threads adhered to each of the material layer(s), coils, etc.), which is located between material layer(s) 104 and 106, can maintain the gap between the material layer(s) 104, causing these planar surfaces to bend around the object and envelop it.

Examining this capture operation more closely, when the space object(s) impact a first group of threads in the ballistic layer at a first millisecond in time, the structural element begins to distort and physically move. In the next millisecond, the space object(s) impacts additional threads in the ballistic layer, and the satellite further distorts, bending around the space object, akin to throwing a ball at a loosely supported towel. Thus, contact pressures may be spread over time, such that pressure does not exceed the maximum sheer pressure of the space object(s) (e.g., so that the space object(s) does not break-up).

The capture operation requires rendezvousing with the space object(s) at a rate and in an attitude such that the largest surface area of the structural element (e.g., one of the major surfaces of the two sides 103, 105) will receive the space object(s). The enveloping operation may be facilitated by a structural element that is relatively large compared to the size of the space object(s). Since satellites in accordance with the present teachings have such low-mass, and highly flexible structural elements, the structural elements can be made arbitrarily large at little capital cost and launch cost. For example, satellites in accordance with the present teachings may have structural elements in excess of tens of meters (e.g., 20 meters, 30 meters, etc.).

Once the structural element envelops the space object(s), the drag of the combined satellite/space object(s) will increase, which will tend to cause them to de-orbit. The addition of an electrodynamic tether, as previously discussed, can accelerate the de-orbiting operation. In some alternative embodiments, after capturing the space object(s), the satellite can be designed to separate into pieces that remain tethered to one another, again increasing drag to hasten de-orbiting of the satellite/space object(s). This separation operation may be implemented, for example, by having a long ballistic thread (e.g., that is fastened to the satellite at several robust locations), where the thread separates the satellite, but holds the various separated portions together.

FIGS. 10A through 10D depict a further embodiment of a method for capturing space object(s). In this embodiment, satellite 800 and space object(s) 1074 may initially be in different orbits. Consequently, to effect capture of space object(s) 1074, satellite 800 can change its altitude and/or attitude. Although illustrated for the capture method depicted in FIGS. 8A through 8D, this applies for the method depicted in FIGS. 9A through 9D, and the "combined" method described (but not illustrated).

Figure 10A:
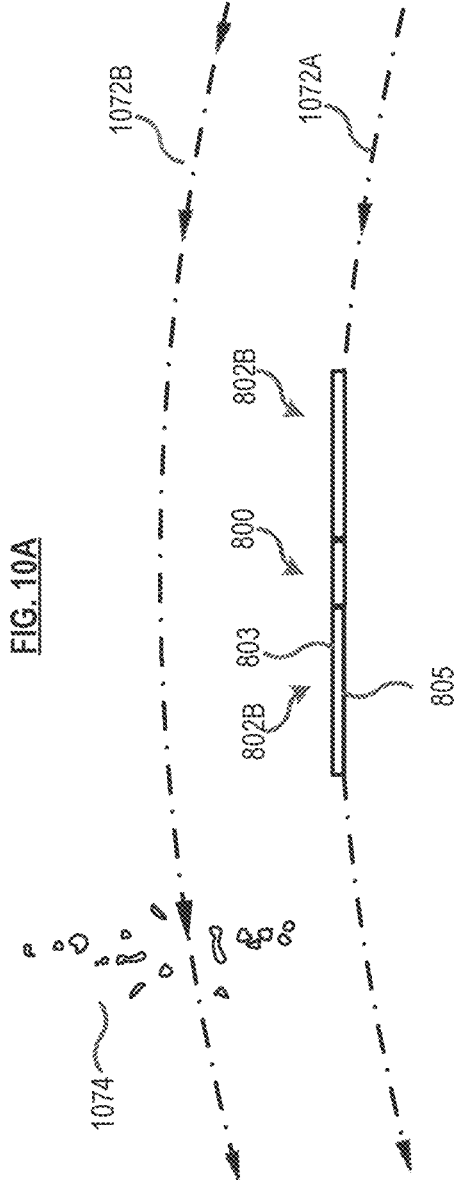
FIGS. 10A through 10D depicts a third embodiment of a method by which the satellite of FIG. 1 captures space object(s).

Referring now to FIG. 10A, satellite 800 having structural elements 802A and 802B is traveling along orbital path 1072A. Space object(s) 1074 may travel along orbital path 1072B. In FIG. 10A, the long axis of structural elements 802A and 802B may be aligned with the in-track direction, a broad (major) surface 803 (such as may be bearing solar cells), and a broad (major) surface 805 (such as may be bearing antenna elements) may be directed toward space and the Earth, respectively.

Figure 10B:
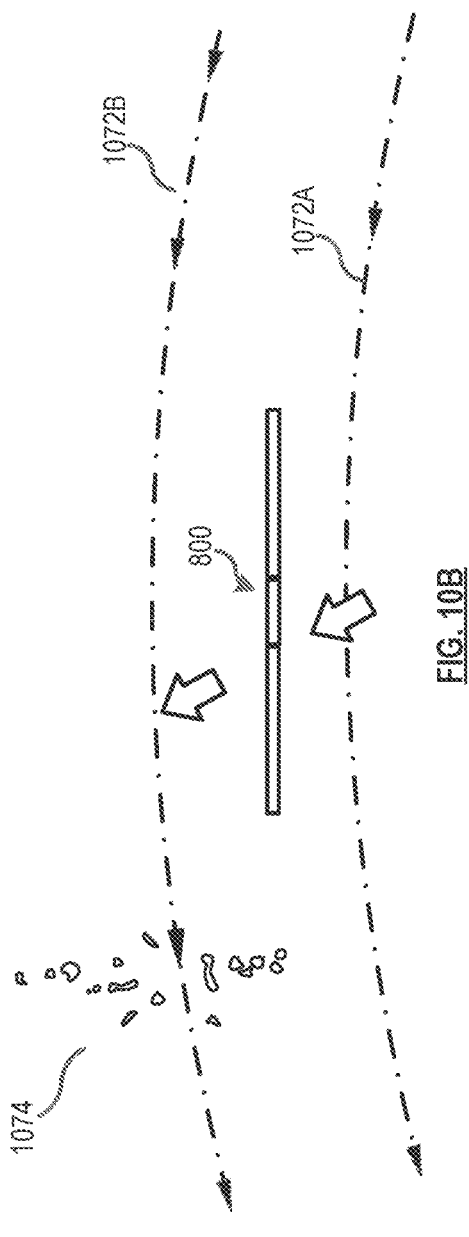

Referring now to FIG. 10B, a ground-based tracking network determines that space object(s) 1074 are traveling along orbital path 1072B. A ground station in communication with satellite 800 transmits a command for the satellite to alter its altitude to capture space object(s) 1074. The satellite's propulsion system may be actuated to alter the altitude of the satellite, moving it toward orbit 1072B.

Figures 10C, 10D:
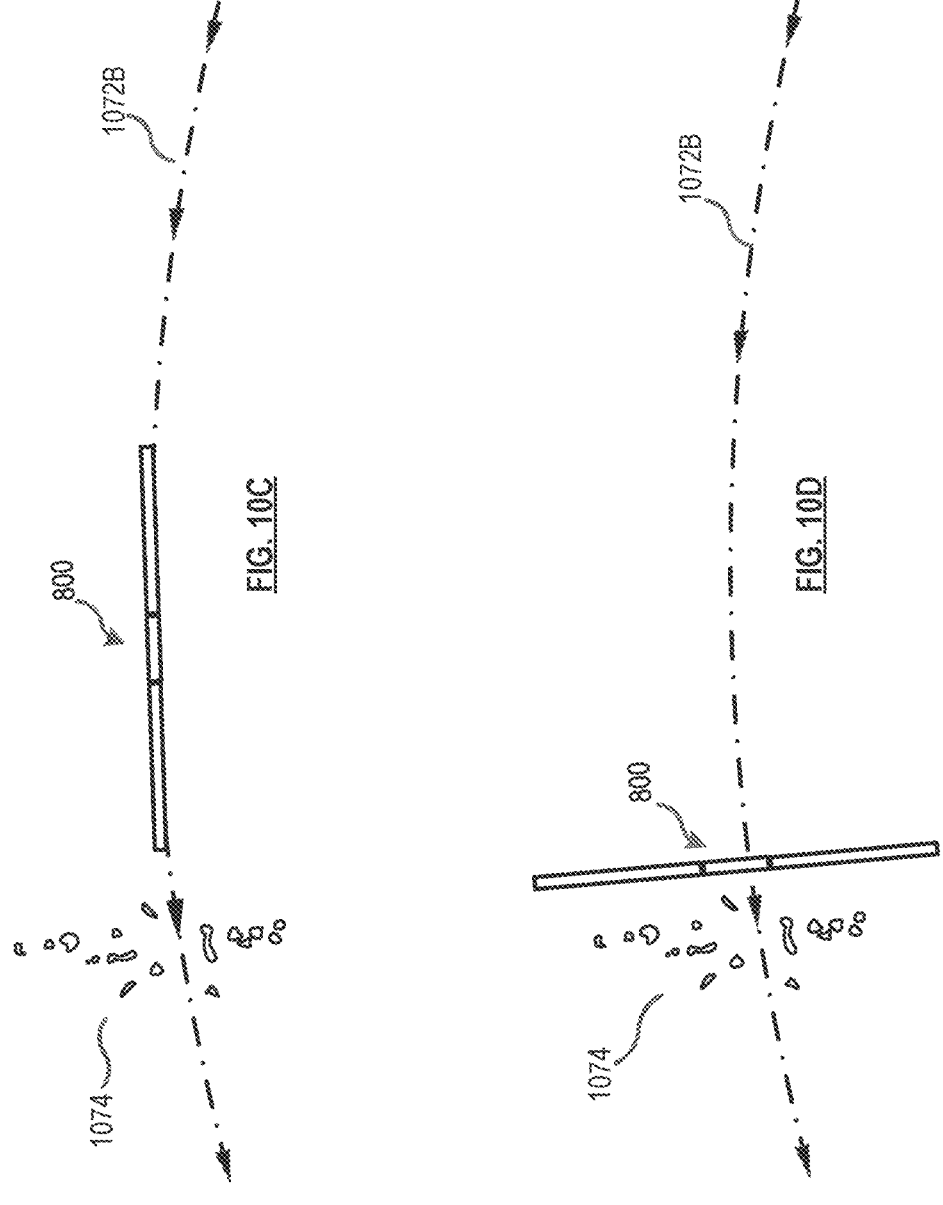

FIG. 10C depicts satellite 800 in orbit 1072B with space object(s) 1074. In this embodiment, the attitude of satellite has not yet been altered; that is, the structural elements are still in line with the in-track direction, and not yet positioned to intercept space object(s) 1074. FIG. 10D depicts satellite after it has altered its attitude based on a command from the ground station. As in previous embodiments, this change in attitude presents the major surfaces of the structural elements to the space object(s). Subsequently, satellite 800 captures space object(s) 1074 and may be de-orbited, using any of the techniques previously described, or others as that would occur to those skilled in the art in view of the present teachings.

As previously discussed, in some embodiments, the structural element(s) of the satellite include one or more inflatable regions. The inflatable region(s) are deflatable when impacted by the space object(s). As such, in some cases, the captured space object(s) may cause deflation of the one or more inflatable regions, which in turn, can initiate or cause deorbiting of the satellite. For instance, small debris may penetrate some or all of the layers of ballistic material in the material layer(s), and may possibly puncture the material forming the inflatable regions of the satellite itself. In the latter scenario, the satellite can deflate as gas is released through the puncture, and subsequently de-orbit.

It is to be understood that the disclosure describes a few embodiments and that many variations of the invention can easily be devised by those skilled in the art after reading this disclosure and that the scope of the disclosed embodiments is to be determined by the following claims.

What is claimed is:

1. A satellite, comprising:

inflation means for causing one or more inflatable regions to inflate;

at least one structural element that is deformable during a collision with one or more space objects, the at least one structural element comprising:

a first side comprising a first layer of material;

a second side spaced apart from the first side to define an interior portion between the first side and the second side, the second side comprising a second layer of material, wherein the first layer of material and the second layer of material comprise: one or more layers of ballistic material; and at least one material disposed within the interior portion, the at least one material designed to absorb energy overtime during a collision process with each of the one or more space objects, wherein one or more of the first layer of material, the second layer of material and the at least one material that is disposed within the interior portion are configured to capture the one or more space objects that impact the at least one structural element and alter orbit of the satellite and the one or more space objects captured thereby after collision with the satellite, and wherein deflation of the one or more inflatable regions initiates deorbiting of the satellite.

2. The satellite of claim 1, wherein the at least one material is an energy absorbing material, and the first layer of material and the second layer of material are substantially planar materials spaced apart by the energy absorbing material.

3. The satellite of claim 1, wherein the at least one material disposed within the interior portion comprises:

deformable material disposed in different cross-sectional planes of the interior portion such that different portions of the deformable material come into contact with and absorb energy of the one or more space objects at different time instants during the collision process with each of the one or more space objects as the at least one structural element deforms and wraps around at least part of the one or more space objects.

4. The satellite of claim 1, wherein the at least one material disposed within the interior portion comprises one or more of:

fibrous material, fabric material, filaments of material, material having mesh-like structure comprising a grid having a number of openings;

material having a lattice structure, and material having a helical spring-like structure.

5. The satellite of claim 1, further comprising:

a coil of electrically conductive material with a mass on one end thereof, wherein the coil is configured to release after a collision with the one or more space objects to initiate deorbiting of the satellite.

6. The satellite of claim 1, wherein the one or more layers of ballistic material comprise one or more of: an aramid-based material, a high-density polyethylene (HDPE) material, or an ultra-high molecular weight polyethylene (UHMWPE) material.

7. The satellite of claim 1, wherein the first side further comprises a first thin film structure comprising:

at least one thin film antenna.

8. The satellite of claim 1, wherein the one or more inflatable regions of the at least one structural element are deflatable upon being impacted by the one or more space objects, and wherein deflation of the one or more inflatable regions causes the at least one structural element to wrap around and encompass at least part of the one or more space objects.

9. The satellite of claim 1, wherein the at least one material is compressed for launch of the satellite and released to expand once in space.

10. The satellite of claim 1, further comprising:

one or more payload elements, wherein the one or more payload elements are non-releasable from the satellite when the satellite collides with the one or more space objects.

11. The satellite of claim 1, wherein the satellite further comprises:

a directional and attitude controller for controlling one or more of attitude, position and velocity of the satellite to cause the at least one structural element to collide with the one or more space objects, capture the one or more space objects, and modify a time for the satellite to de-orbit.

12. The satellite of claim 1, wherein the satellite further comprises:

a propulsion system;

one or more actuators; and at least one controller configured to:

control attitude, position and velocity of the satellite via the propulsion system and the one or more actuators to cause the at least one structural element to collide with the one or more space objects; and after capturing the one or more space objects:

cause a de-orbit of the satellite and the one or more space objects captured thereby.

13. The satellite of claim 1, wherein the satellite further comprises:

an attitude determination and control system (ADCS) for orienting the satellite;

a propulsion system comprising one or more actuators for controlling position and/or attitude of the satellite; and at least one controller configured to:

control one or more of the ADCS and the propulsion system to cause to the at least one structural element to collide with the one or more space objects; and cause a de-orbit of the satellite after capturing the one or more space objects.

14. A satellite, comprising:

at least one structural element that is deformable during a collision with one or more space objects, the at least one structural element comprising:

a first side comprising a first layer of material;

a second side spaced apart from the first side to define an interior portion between the first side and the second side, the second side comprising a second layer of material; and at least one material disposed within the interior portion, the at least one material designed to absorb energy over time during a collision process with each of the one or more space objects, wherein one or more of the first layer of material, the second layer of material and the at least one material that is disposed within the interior portion are configured to capture and alter orbit of the satellite and the one or more space objects captured thereby after collision with the satellite; and a coil of electrically conductive material with a mass on one end thereof, wherein the coil is configured to release after a collision with the one or more space objects to initiate deorbiting of the satellite.

15. The satellite of claim 14, wherein movement of the coil relative to a magnetic field drives a current through the coil that causes a force to be generated thereby producing a drag thrust that causes the satellite to deorbit.

16. A satellite, comprising:

at least one structural element that is deformable during a collision with one or more space objects, the at least one structural element comprising:

a first side comprising a first layer of material;

a second side spaced apart from the first side to define an interior portion between the first side and the second side, the second side comprising a second layer of material;

at least one material disposed within the interior portion, the at least one material designed to absorb energy overtime during a collision process with each of the one or more space objects, wherein one or more of the first layer of material, the second layer of material and the at least one material that is disposed within the interior portion are configured to capture and alter orbit of the satellite and the one or more space objects captured thereby after collision with the satellite, and wherein the at least one material is formed in a shape of one or more coils, and wherein each coil comprises: a length of material that is wound or arranged in a spiral configuration or as a sequence of rings, wherein each coil is oriented either: substantially parallel to a longitudinal axis defined by the interior portion, or substantially perpendicular to the longitudinal axis defined by the interior portion.

17. A satellite, comprising:

at least one structural element that is deformable during a collision with one or more space objects, the at least one structural element comprising:

a first side comprising a first layer of material;

a second side spaced apart from the first side to define an interior portion between the first side and the second side, the second side comprising a second layer of material; and at least one material disposed within the interior portion, the at least one material designed to absorb energy overtime during a collision process with each of the one or more space objects, wherein one or more of the first layer of material, the second layer of material and the at least one material that is disposed within the interior portion are configured to capture and alter orbit of the satellite and the one or more space objects captured thereby after collision with the satellite, wherein the first side further comprises a first thin film structure comprising a thin film antenna, and wherein the second side further comprises a second thin film structure opposite the first thin film structure and a plurality of thin film solar cells, and wherein the first side or the second side further comprises a thin film battery.

18. The satellite of claim 17, wherein the thin film antenna comprises an electrode printed on a carrier layer, wherein the electrode functions as an antenna element, and wherein the second side further comprises:

a support substrate that is configured to support the plurality of thin film solar cells, wherein the support substrate is separable from the electrode by a specific separation distance and serves as a ground plane for the antenna element, wherein the first side is spaced apart from the second side by one or more support members upon deployment, wherein the plurality of thin film solar cells and the thin film antenna are flexible, wherein the at least one structural element is in a folded or rolled configuration prior to deployment, and wherein the one or more support members comprise:

one or more inflatable elements for deploying the at least one structural element upon inflation, wherein the one or more inflatable elements cause the support substrate to be spaced apart from the electrode by the specific separation distance upon being inflated.

19. The satellite of claim 18, wherein support substrate comprises:

a supporting layer, wherein the plurality of thin film solar cells overlies one surface of the supporting layer; and a thin conductive layer that overlies another surface of the supporting layer, wherein the thin conductive layer serves as the ground plane of the antenna element, wherein the thin conductive layer comprises: a metallized layer, and wherein the supporting layer and the carrier layer each comprise one or more of: polyethylene terephthalate (PET) film, a nylon film, a mylar film, a polyamide film and a polyimide film.

20. The satellite of claim 17, wherein the first thin film structure comprises:

a plurality of thin film antennas configured as a phased antenna array, wherein the plurality of thin film antennas include the thin film antenna.

* * * * *